United States Patent [19]

Chuang et al.

[11] 4,048,615
[45] Sept. 13, 1977

[54] AUTOMATED CHARACTER RECOGNITION SYSTEM

[75] Inventors: Ping-chien Chuang, Irving; Joseph A. Plunkett, Plano, both of Tex.

[73] Assignee: Recognition Equipment Incorporated, Dallas, Tex.

[21] Appl. No.: 692,767

[22] Filed: June 4, 1976

[51] Int. Cl.[2] ............................................. G06K 9/12
[52] U.S. Cl. ........................................ 340/146.3 AC
[58] Field of Search .......... 340/146.3 AC, 146.3 MA, 340/146.3 J, 146.3 R

[56] References Cited

U.S. PATENT DOCUMENTS

| | | | |
|---|---|---|---|
| 3,140,466 | 7/1964 | Greanias et al. | 340/146.3 AC |
| 3,483,512 | 12/1969 | Atkins | 340/146.3 MA |
| 3,541,511 | 11/1970 | Genchi et al. | 340/146.3 AC |
| 3,639,902 | 2/1972 | Dietrich | 340/146.3 AC |
| 3,873,972 | 3/1975 | Levine | 340/146.3 AC |

FOREIGN PATENT DOCUMENTS 1,253,302   11/1971   United Kingdom ...... 340/146.3 AC

OTHER PUBLICATIONS

Grimsdale et al., "A System for the Automatic Recognition of Patterns," Proc. of I.E.E., vol. 106, No. 26, Mar. 1959, pp. 210-221.

*Primary Examiner*—Leo H. Boudreau
*Attorney, Agent, or Firm*—John E. Vandigriff; Thomas W. DeMond

[57] ABSTRACT

A reliable optical character recognition system substantially insensitive to variations in character stroke size is provided for reading numeric and special characters printed on a document surface in plural fonts of unknown order. More particularly, a character is scanned and its image stored in a two-dimensional mosaic without requiring precise positioning therein, amplitude correlation for video signal quantization, or normalization of character stroke sizes. The image mosaic is scanned by a row-column analyzer to detect primary features of the image including the number of character segments in the rows and columns, the segment length and rightmost segment coordinate for those rows containing only a single segment, and the segment length for those columns having a single segment. Feature decision logic analyzes the primary features to form a set of secondary features based upon the occurrence and order of the primary features. The set of secondary features then are analyzed in a sequential logic decision tree to identify the character.

10 Claims, 18 Drawing Figures

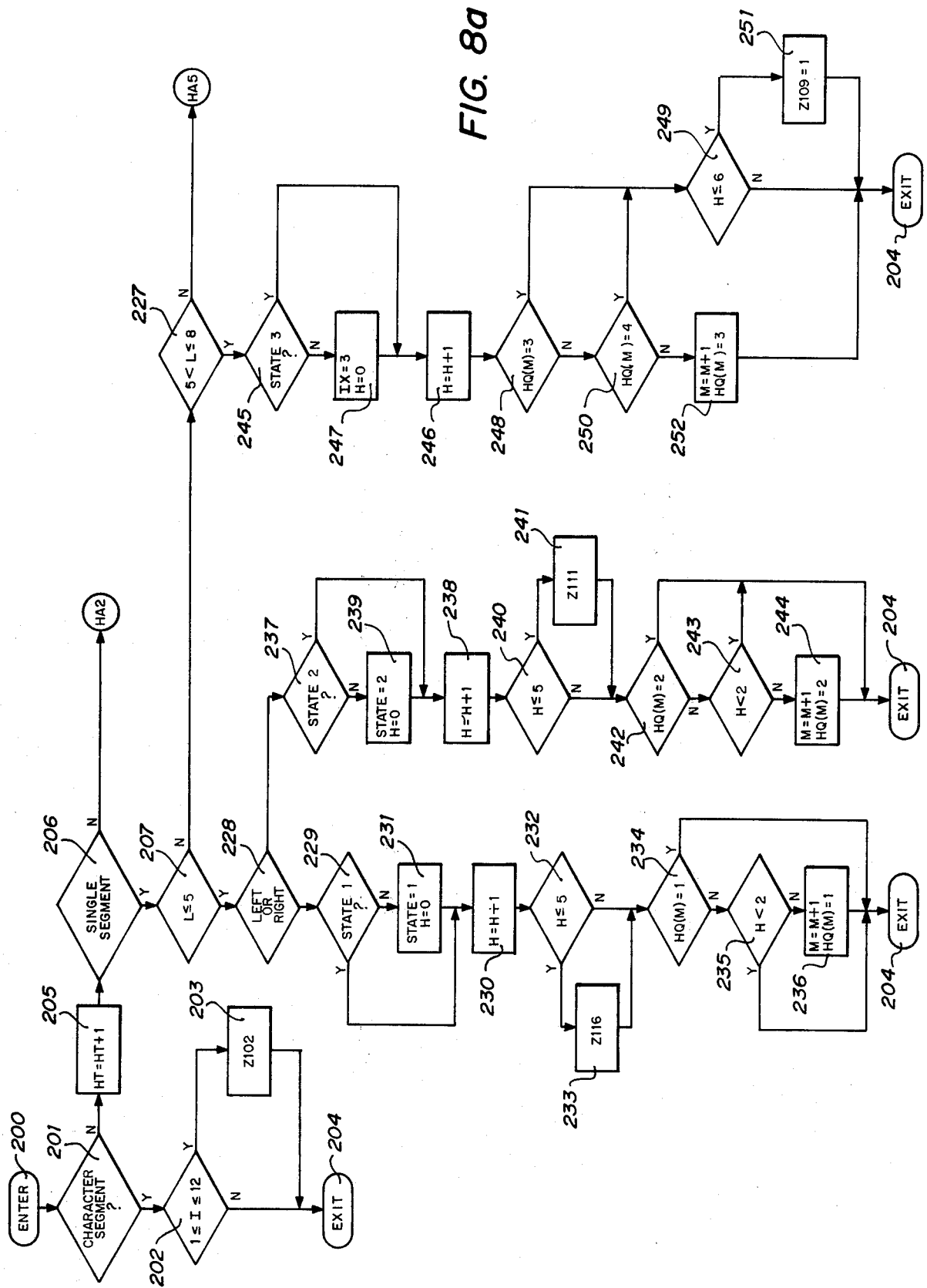

AUTOMATED CHARACTER RECOGNITION SYSTEM

FIELD OF THE INVENTION

The present invention relates to optical and magnetic ink character recognition systems, and more particularly to a system for reading numerics and special characters printed in plural fonts of unknown order.

PRIOR ART

Character recognition systems employing a two-dimensional analysis of an electrical character image have long been in use. Such systems generally fall into one of the three categories including template matching, contour tracing and feature analysis systems. U.S. Pat. No. 3,873,972 to Levine discloses a feature analysis character recognition system using row analysis and column analysis of an image stored in a memory. The row analysis is completed first, and a column analysis is initiated only if the row analysis has not led to a single character identification. Character decision is accomplished by forming memory addresses from row and column sequence, duration and orientation codes, and AND'ing character designating words stored at the addressed memory locations. Further methods of two-dimensional analysis are disclosed in U.S. Pat. No. 3,706,071 to Gray and U.S. Pat. No. 3,815,090 to Muenchheusen.

The reliability of prior recognition systems has been compromised by recurring reading problems which have not been accommodated. For example, the template matching systems have been sensitive to variations in character stroke size, and have required a precise centering of a character image in an image mosaic. To overcome variations in stroke size, image normalization and amplitude correlation have been employed.

The contour tracing and feature analysis systems have used numerous feature characteristics such as degree of curvature, segment slopes and other segment orientations that give rise to complex hardware configurations. Further, such systems have required additional feature derivation to resolve ambiguities which may arise in identifying a character.

The present invention provides a more simplistic character recognition system which is substantially insensitive to variations in stroke size, and which requires no amplitude correlation, image normalization or precise centering of a character image in an image mosaic. Further, a character is recognized through the detection of a minimal feature set, and conflicting character decisions are resolved without further feature derivation.

SUMMARY OF THE INVENTION

An automated and reliable system is provided for reading characters printed on a document surface in plural fonts of unknown order.

More particularly, a character image is analyzed on a row by row basis to detect primary horizontal features including the number of character segments in each row, the segment length and rightmost segment coordinate where a single short segment occurs in a row, and the length of the segment where a single segment other than a short segment occurs in a row. Upon completion of the row analysis, the character image is analyzed on a column by column basis to detect primary vertical features including the number of character segments in each column and the length of a character segment in those columns having only a single segment.

During the row-column analysis, each row and column is analyzed to determine primary features including the type and number of character segments occurring therein, and the current primary features are compared to those of previous rows and columns. Secondary features derived from such comparisons include the order of occurrence of segment types, interrelationships between such segment types and the influence a segment type is to have in the decision process. The secondary features then are analyzed in a sequential logic decision tree which detects the occurrence and order of the secondary features, and identifies a character based upon the influence to be accorded designated sequences of such secondary features.

In one aspect of the invention, both horizontal and vertical primary features are detected to increase recognition reliability, and to substantially reduce the occurrence of decision conflicts.

In a further aspect, a minimal feature set has been defined to accommodate the recognition of plural font numerics and special characters by a system less complex than that of prior systems.

DESCRIPTION OF THE DRAWINGS

For a more complete understanding of the present invention and for further objects and advantages thereof, reference may now be had to the following description taken in conjunction with the accompanying drawings in which:

FIGS. 8A and 8B are detailed logic decision flow diagrams of the horizontal feature analyzer of FIG. 7;

DESCRIPTION OF PREFERRED EMBODIMENTS

FIG. 1

Figure 1:
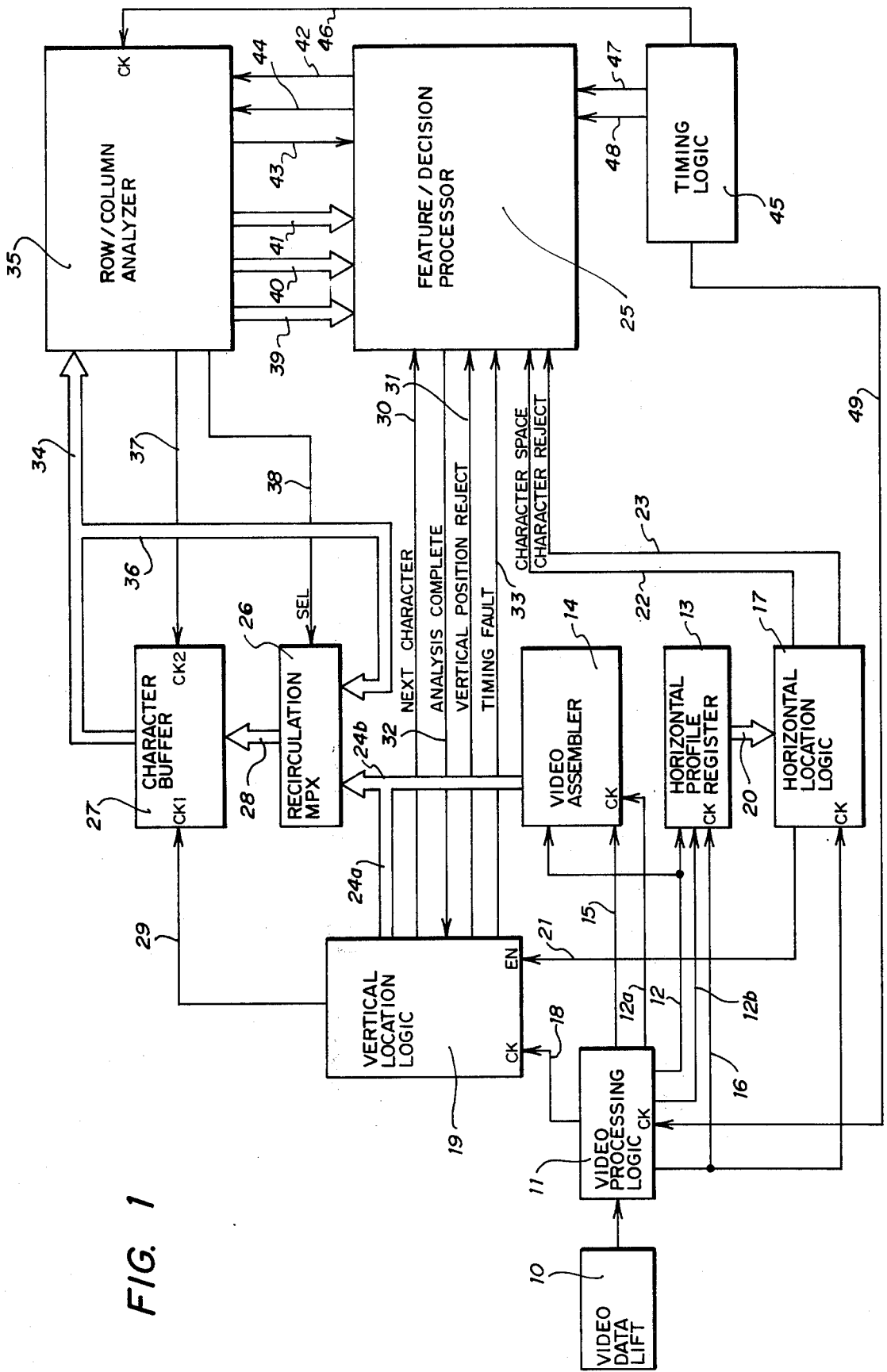
FIG. 1 is a functional block diagram of a character recognition system embodying the invention.

FIG. 1 is a functional block diagram of a character recognition system embodying the invention.

Characters printed on a document surface are scanned by a video data lift unit 10 which in the preferred embodiment described herein is a photosensor array. A video processing logic unit 11 conditions and digitizes the analog responses of the array to provide black/white video data serially along a data line 15 to a video assembler 14 and along data line 12 to register 13. Logic unit 11 also supplies an information detected signal on a control line 12b to the data input of a twelve bit horizontal profile register 13. In addition, logic unit 11 provides a sixty-four cycle per vertical scan clock signal to a control line 12a leading to the clock input of assembler 14, a one cycle per vertical scan clock signal to a control line 16 leading to the clock inputs of profile register 13 and a horizontal location logic unit 17, and a clock signal to a control line 18 leading to the clock input of a vertical location logic unit 19.

Under the control of the clock signal on line 16, horizontal profile register 13 receives the information detected signal on line 12b for twelve consecutive scans and supplies such data in parallel to logic unit 17 by way of lines 20. Upon detecting the presence of a character image in register 13, logic unit 17 issues a character located pulse to a control line 21 to enable logic unit 19. If eighteen void or white vertical scans are sensed in the information supplied to register 13 after a character presence has been indicated, logic unit 17 issues a character space pulse to a control line 22 leading to one input of a feature-decision processor 25. In addition, if fewer than a reference number of vertical scans have information content therein, logic unit 17 issues a character reject pulse to a control line 23 leading to a second input of processor 25.

The character image data in assembler 14, which in the preferred embodiment is comprised of twelve sixty-four bit shift registers, is applied under the control of the clock signal on line 12a to the vertical location logic unit 19 by way of data lines 24a. Logic unit 19 scans the image mosaic of assembler 14 to vertically locate a character image. Upon detecting the top of a character image, unit 19 issues a clock signal along a control line 29 to the CK1 input of character buffer 27. Unit 19 thereby controls the transfer of the image data from assembler 14 through a data lines 24b to a recirculation multiplexer 26, and from the multiplexer 26 to a character buffer 27 by way of data lines 28.

Upon completing the transfer of data from assembler 14 to character buffer 27, unit 19 issues a next character pulse to a control line 30 leading to a third input of processor 25. If unit 19 does not detect a character image top within fifty-one cells from the top of the assembler 14 after receiving a character located signal from logic unit 17, unit 19 issues a vertical position reject signal on a control line 31 leading to a fourth input of processor 25. The reject signal is an indication that a skew or misregistration condition with the character occurred during a video scanning, and that as a result the top of the character image is too low in assembler 14 for a complete character image to be represented therein.

In the event that logic unit 19 receives a character located signal on control line 21 prior to receiving an analysis complete signal from processor 25 by way of a control line 32, logic unit 19 issues a timing fault signal to a control line 33 leading to a fifth input of processor 25. An indication is provided thereby that not enough time has elapsed to fully process the character image presently stored in character buffer 27.

In the preferred embodiment described herein, character buffer 27 is a twenty row by twelve column buffer accommodating character images which nominally are sixteen rows by ten columns in size. The image data in character buffer 27 is provided in parallel a row at a time to data lines 34 leading to data inputs of a row-column analyzer 35, and to data lines 36 leading to a second input of recirculation multiplexer 26.

Analyzer 35 controls the transfer of data from buffer 27 to both the analyzer and the multiplexer 26 by issuing a clock signal to a control line 37 leading to the CK2 input of buffer 27. Analyzer 35 also issues a select pulse to a control line 38 leading to the select input of multiplexer 26 to select the multiplexer to data lines 24b or to data lines 36. Analyzer 35 further scans the rows the columns of the character buffer 27 to detect primary features including the number of character segments in each row and column, and the segment length and rightmost segment coordinate for those rows having a single segment. The number of segments are provided on data lines 39, the length of a row segment is provided on data lines 40, and the rightmost segment coordinate in a row is provided on data lines 41. Upon completing the horizontal scanning of a row or the vertical scanning of a column of character buffer 27, analyzer 35 generates a next feature signal on a control line 43 leading to an input of processor 25.

Upon receiving a next character signal on line 30, processor 25 issues a begin analysis signal to analyzer 35 by way of a control line 42. Thereafter, processor 25 receives the primary features detected by analyzer 35 on data lines 39, 40 and 41 for the first row of the character image in character buffer 27, and derives secondary features therefrom. Upon analyzing the primary feature data set, processor 25 issues a feature analyzed signal on a control line 44 to indicate that the next row of character buffer 27 may be scanned. After all twenty rows of character buffer 27 have been horizontally scanned and processed, analyzer 35 initiates a vertical scanning of character buffer 27 upon receiving a next feature signal on line 43. The twelve columns of the character image in buffer 27 then are processed in a manner analogous to that for the rows.

The operation of video processing logic unit 11, feature decision processor 25 and row-column analyzer 35 is synchronized by a timing logic unit 45. Unit 45 provides a clock signal having a 750 nanosecond period on a control line 46 leading to the clock input of analyzer 35, a clock signal having a 625 nanosecond period on a control line 47 leading to a first clock input of processor 25, a clock signal having a 625 nanosecond period on a control line 48 leading to a second clock input of processor 25 and a clock signal having a 625 nanosecond period on a control line 49 leading to the clock input of logic unit 11.

In operation, video data lift unit 10 scans information printed on a document surface, and the sensor responses are conditioned and digitized by video processing logic unit 11. The digitized video signal is applied serially at the vertical scan rate to horizontal profile register 13 and video assembler 14. Twelve consecutive scans of video data are stored from top to bottom in the twelve sixty-four bit shift registers comprising video assembler 14. Each of the twelve bits of profile register 13 provides an indication of the presence of character information in the corresponding twelve shift registers of video assembler 14.

Horizontal location logic unit 17 receives the data stored in profile register 13 under the control of the clock signal on line 16. Upon detecting information in the video data, logic unit 17 enables an internal counter which is clocked at the scan rate. If information is detected in each of the next scans as monitored by the counter, logic unit 17 issues a character located pulse on control line 21 to enable vertical location logic unit 19. If too few scans have information content to comprise a character, however, the logic unit 17 issues a character reject pulse on control line 23. If eighteen void or white vertical scans occur in the video assembler 14 after a character presence has been indicated, logic unit 17 issues a character space pulse on a control line 22 to indicate that a space between characters has occurred.

When activated, the logic unit 19 operates under the control of the clock signal on control line 18 to vertically locate the top of a character image in the video assembler 14. Upon locating the image top, logic unit 19 controls the transfer of the character image from assembler 14 through a recirculation multiplexer 26 to character buffer 27. More particularly, logic unit 19 issues a clock signal on line 29 to position the top of the character image at the second row from the top of character buffer 27. Upon completion of the image transfer, the logic unit 19 issues a next character signal by way of a control line 30 to indicate that a new character image has been stored in character buffer 27.

In response to a next character signal, feature decision processor 25 issues a begin analysis signal on control line 42 to activate row-column analyzer 35 and thereby initiate a character recognition process. Analyzer 35 thereupon sequentially analyzes character buffer 27 on a row by row basis beginning with the top row, and detects the primary features of the character image including the number of character segments appearing in a row, the segment lengths and the rightmost segment coordinates. Upon completing the horizontal analysis of an image row of buffer 27, the analyzer 35 issues a next feature signal to control line 43. The processor 25 thereupon derives secondary features based upon the occurrence and order of the primary features, and upon completion issues a feature analyzed signal on line 44. In response, analyzer 35 advances character buffer 27 to analyze a next row of video data and recirculates the previous row into the character buffer by way of multiplexer 26. More particularly, analyzer 35 issues a clock signal on line 37 to control the transfer of data from the character buffer 27 to the analyzer, and issues a select signal on line 38 to control the recirculation of such data back into the character buffer. The above described process is repeated until all twenty rows of character buffer 27 have been processed and recirculated back into the buffer.

After the last row of character buffer 27 has been analyzed, vertical analysis of character buffer 27 is initiated by analyzer 35 upon the receipt of a feature analyzed signal on line 44. As before, primary features including the number of segments and segment lengths for each column of character buffer 27 are determined and forwarded to processor 25. The rightmost segment coordinate feature, however, is not used in the vertical scan analysis.

Upon completion of the row-column analysis of character buffer 27, feature decision processor 25 identifies a character by applying the secondary features derived during the row-column analysis to a tree-like decision logic. The decision logic is capable of recognizing numerics printed in the OCRA, 1428, 12L2/12F2, OCRB and 1403 optical character recognition COCR fonts in any order, and special characters including the hook ⌐, the fork Ψ and the chair ⊓. Upon identifying a character, processor 25 issued an analysis complete signal on line 32 to indicate that a new character image may be transferred into character buffer 27. Processor 25 then awaits the receipt of a next character signal on line 30.

FIG. 2

Figure 2:
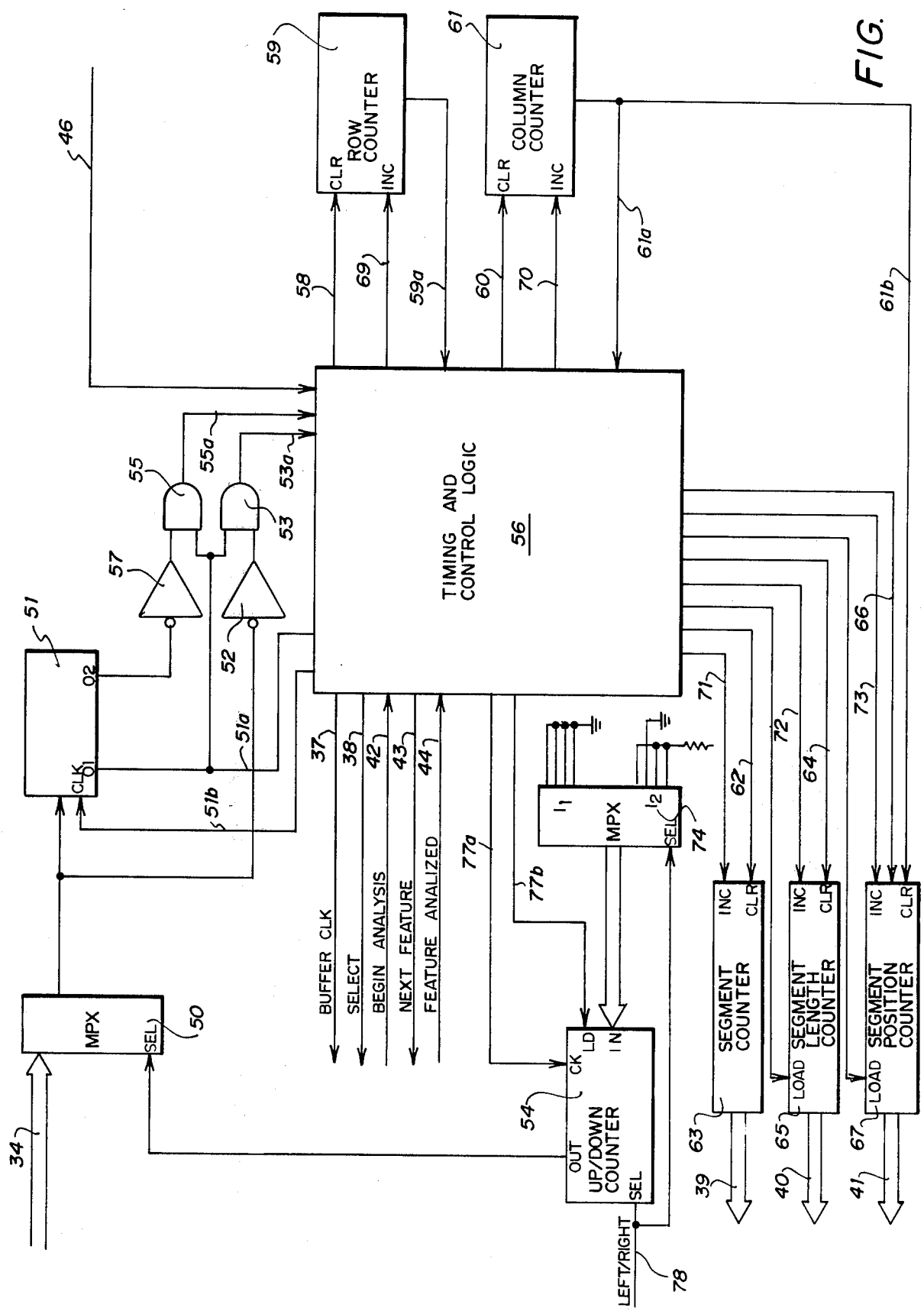
FIG. 2 is a detailed functional block diagram of the row-column analyzer of FIG. 1.

FIG. 2 is a detailed functional block diagram of the row-column analyzer 35 of FIG. 1.

Character image data stored in character buffer 27 of FIG. 1 is provided on data lines 34 connected to the input of a multiplexer 50. The output of the multiplexer is connected to the input of a two bit shift register 51, and through an inverter 52 to one input of an AND gate 53. The select input to multiplexer 50 is connected to the output of an up/down counter 54.

The 01 output of shift register 51 is connected to a second input of AND gate 53, to a first input of an AND gate 55 and by way of a control line 51a to an input of a timing and control logic unit 56. The 02 output of shift register 51 is connected through an inverter 57 to a second input of AND gate 55. The clock input to shift register 51 is connected by way of a control line 51b to an output of logic unit 56.

Timing and control logic unit 56 also issues clear signals on a control line 58 to the clear input of a row counter 59, on a control line 60 to the clear input of a column counter 61, on a control line 62 to the clear input of a segment counter 63, on a control line 64 to the clear input of a segment length counter 65, on a control line 66 to the clear input of a segment position counter 67. In addition, logic unit 56 issues increment command signals to a control line 69 leading to the increment input of counter 59, to a control line 70 leading to the increment input of counter 61, to a control line 71 leading to the increment input of counter 65, and to a control line 73 leading to the increment input of counter 67. The logic unit 56 also provides a clock signal on a control line 77a leading to the clock input of counter 54, and a load signal on a control line 77b leading to the load (LD) input of counter 54.

During the row-column analysis of character buffer 27, logic unit 56 communicates with both processor unit 25 and character buffer 27. More particularly, a select signal is provided on control line 38 leading to multiplexer 26 of FIG. 1, a clock signal is provided on control line 37 leading to character buffer 27, a begin analysis signal is received from processor 25 on control line 42, a begin analysis signal is issued to processor 25 on control line 42, a next feature signal is issued to processor 25 on control line 43 and a feature analyzed signal is received from processor 25 on control line 44. Logic unit 56 also receives a clock signal on line 46 leading from the timing logic unit 45 of FIG. 1. In addition, unit 56 receives inputs from AND gate 53 by way of a control line 53a, from AND gate 55 by way of a control line 55a, from a counter 59 by way of a data line 59a, and from counter 61 by way of a data line 61a.

The output of counter 61 also is connected by way of a data line 61b to the data input of counter 67, and the outputs of counters 63, 65 and 67 are connected to lines 39–41, respectively.

The four data lines connected to a first input I1 of multiplexer 74 are tied to ground to provide a count zero input, while the four data lines connected to a second input I2 of multiplexer 74 are connected for a count eleven input. Multiplexer 74 is selected to I1 or I2 in response to a left-right scan signal on a control line 78 leading from an output of video processing logic unit 11 of FIG. 1. The output of multiplexer 74 is applied to the input of counter 54 which is selected to the up or down count mode by a signal occurring on line 78.

In operation, logic unit 56 is enabled by a begin analysis signal received from feature decision processor 25 on line 42. Counters 59, 61, 63, 65, and 67 are cleared. Counter 54 is loaded with a count eleven or a count zero under the control of a signal on line 77b depending, respectively, upon whether a left to right or a right to left scan direction is indicated on control line 78. As data is transferred in parallel from character buffer 27 to multiplexer 50 by way of twelve bit data lines 34, multiplexer 50 is sequentially selected to the twelve inputs by up/down counter 54. Since analyzer 35 may operate in either a row or a column analysis mode, multiplexer 50 must be selected in sequence to each column comprising a row during a row analysis. If a common analysis is occurring, however, the multiplexer is selected to one common of each of the twenty rows forwarded on data lines 34. The character image then is recirculated through buffer 27 and a next column of each of twenty rows is selected by multiplexer 50 until a complete vertical scanning of buffer 27 has occurred.

The serial output of multiplexer 50 and the 01 and 02 outputs of shift register 51 are sensed by AND gates 53 and 55, which respectively indicate the trailing and leading edges of character segments occurring in buffer 27. Upon the detection of a leading edge of a character segment is indicated by gate 55, logic unit 56 increments the segment counter 63 and the segment length counter 65. Counter 56 thereafter is stepped for each consecutive black cell occurring in a row or column.

As the rows and columns of buffer 27 are being processed, the row counter 59 and the column counter 61 are incremented. When a trailing edge of a character segment in a row analysis is detected as indicated by AND gate 53, the contents of the column counter 61 are loaded into the segment position counter 67. Thus, counter 63 counts the number of character segments occurring in a row or column of character buffer 27, counter 65 counts the lengths of such segments during a row or column analysis, and counter 67 provides the coordinates of such segments only during a row analysis.

Counter 54 is loaded with one of two preset digital inputs provided to multiplexer 74. Under the control of the left-right scan signal issued by logic unit 11 on line 78, counter 54 is loaded with a zero value or a value of eleven. If the character is scanned from right to left, the zero value is loaded into counter 54. If the character is scanned from left to right, however, the eleven value is loaded into the counter. The mode of operation of counter 54 also is controlled by the left-right scan signal on line 78. If a right to left scan has occurred, the counter 54 will count upward. If a left to right scan has occurred, however, the counter will count downward.

Throughout the row and column analysis of character buffer 27, logic unit 56 issues a next feature signal on line 43 at the end of a row or column analysis. Before a next row or column scan may be analyzed, however, a feature analyzed signal must be received on line 44 from the feature decision processor 25.

FIGS. 3A-3C and 4

Figure 3A:
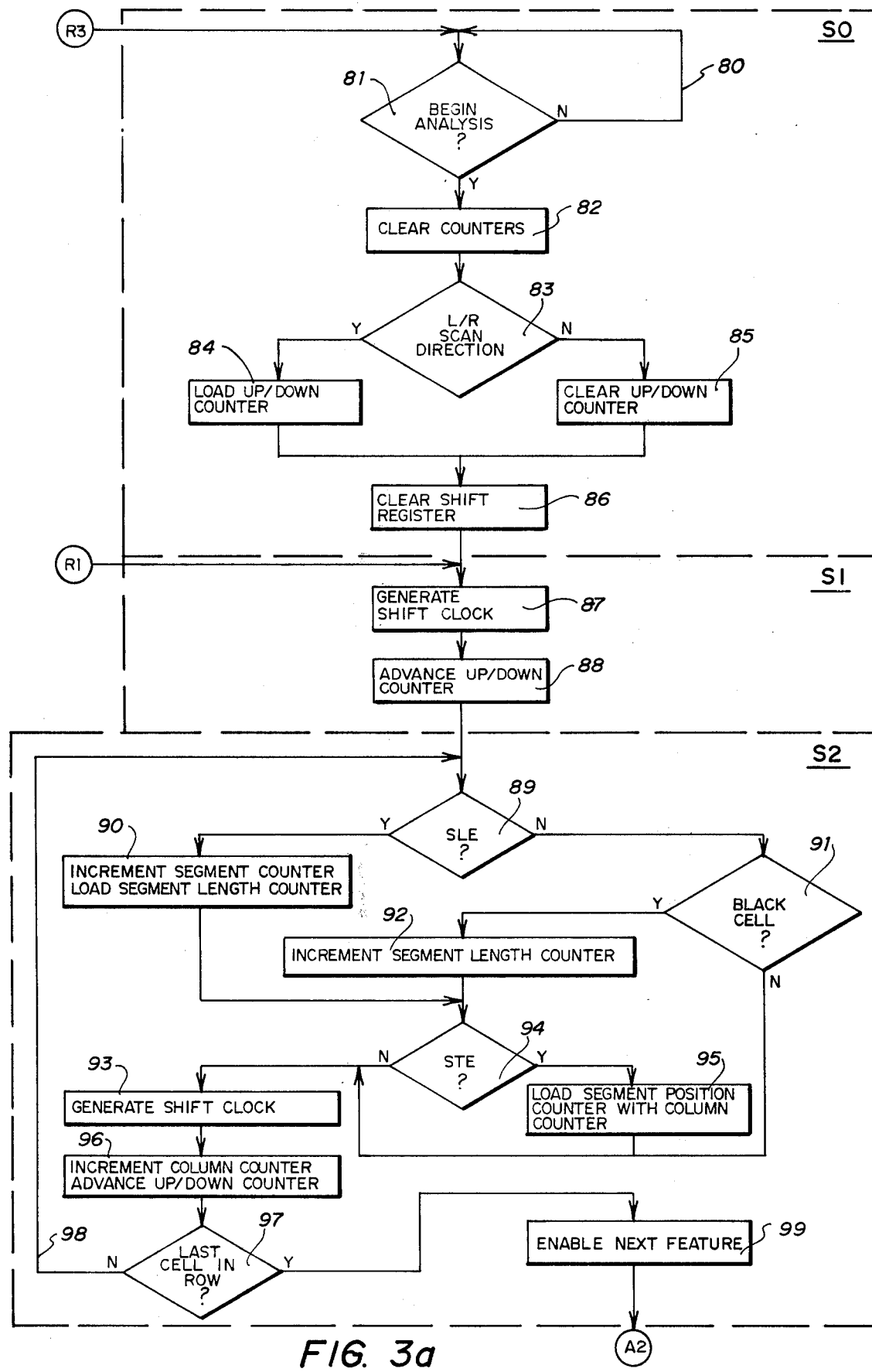
FIGS. 3A-3C are logic decision flow diagrams of the operation of the row-column analyzer of FIG. 2.
Figure 3B:
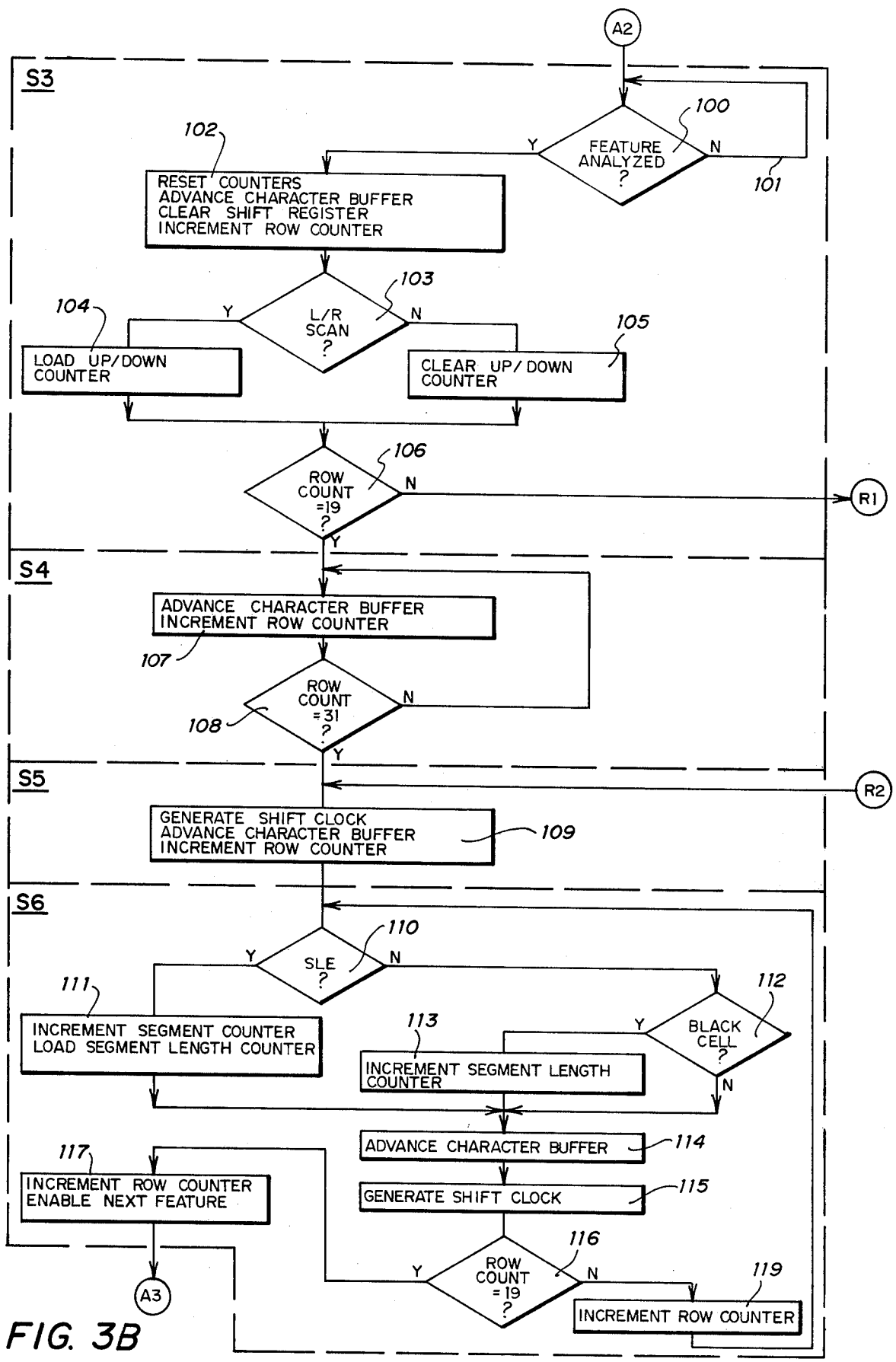
Figure 3C:
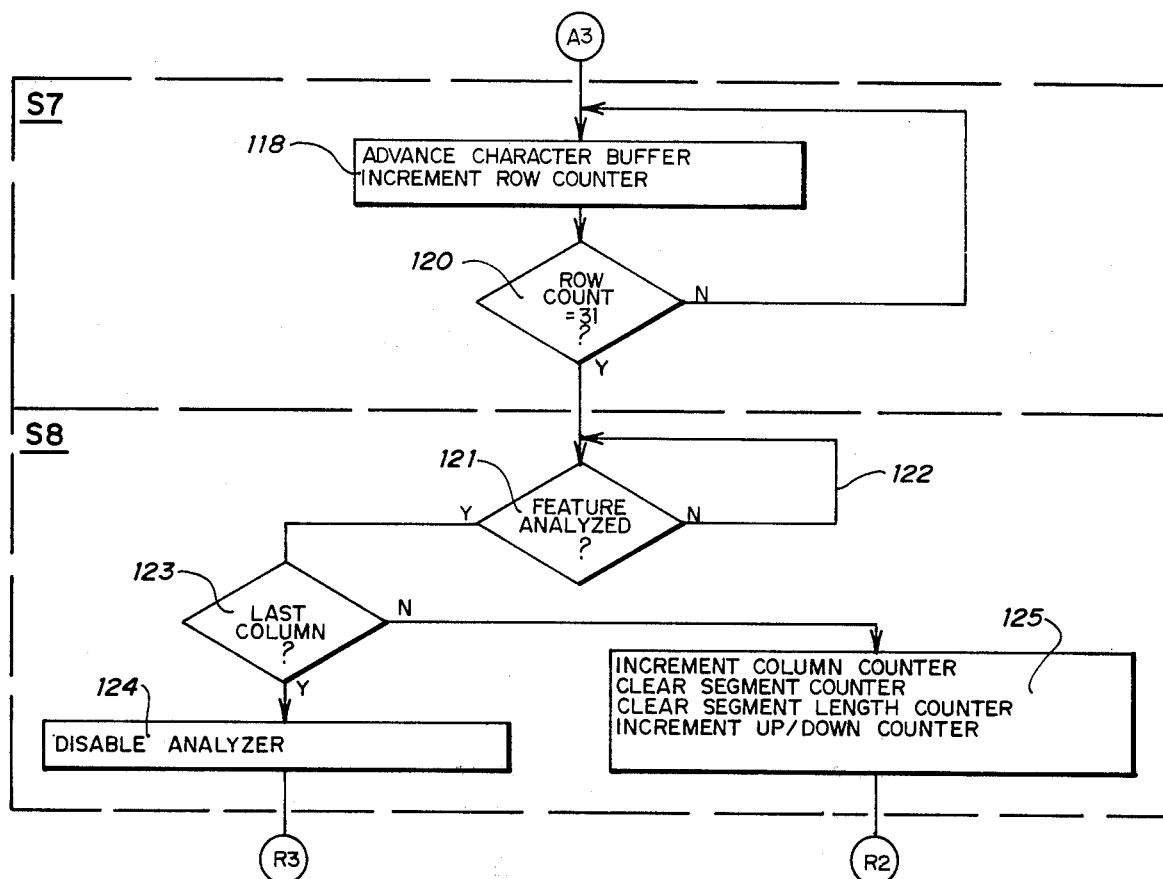
Figure 4:
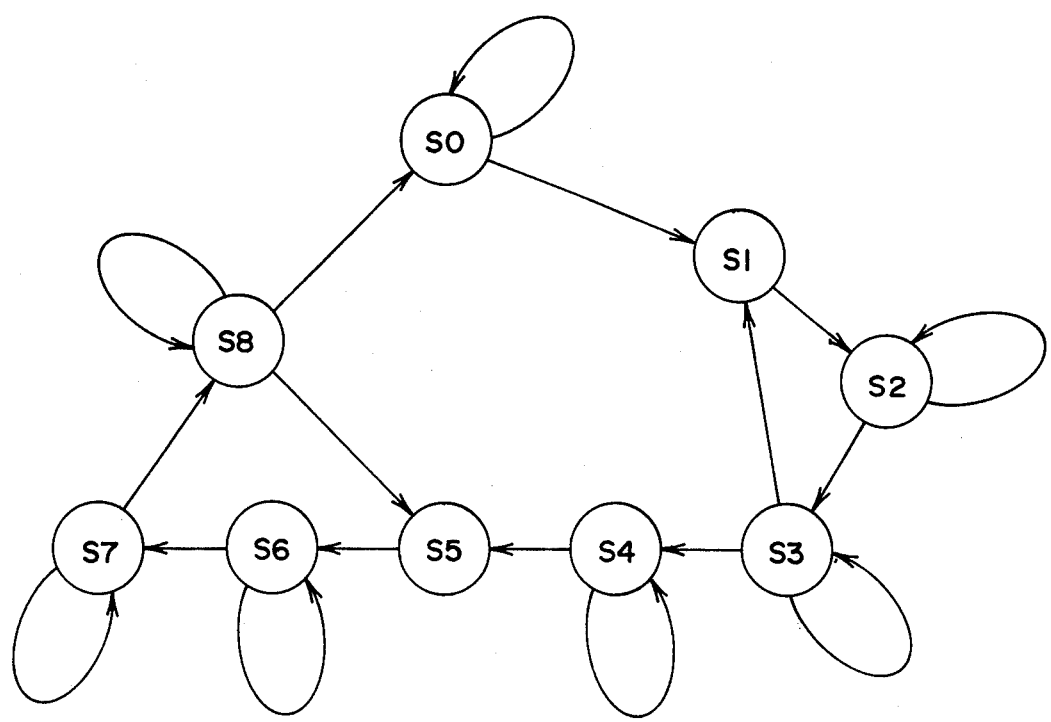
FIG. 4 is a logic state diagram of the operation of the row-column analyzer of FIG. 2.

FIGS. 3A-3C are logic decision flow diagrams and FIG. 4 is a logic state diagram of the operation of the timing and control unit 56 of FIG. 2.

When character buffer 27 of FIG. 1 is not being vertically or horizontally scanned, logic unit 56 remains in state S0 cycling about a logic path 80 of a logic step 81. Upon receipt of a begin analysis from the feature decision processor 25, logic unit 56 is enabled and a transfer is made from step 81 to a logic step 82 where counters 59, 61, 63, 65 and 67 are cleared. From step 82 a transfer is made to a logic step 83 where the scan direction is sensed. If a left to right direction is indicated, a transfer is made from step 82 to a logic step 84 where counter 54 is loaded with a decimal eleven. If the scan is from right to left, however, a transfer is made from step 83 to a logic step 85 where the counter 54 is loaded with a decimal zero. From step 84 or step 85, a transfer is made to a logic step 86 where the register 51 is cleared. A transfer then is made from step 86 to a logic step 87 of a logic state S1.

A logic step 87, a shift clock signal is issued along line 51b to shift register 51, and a transfer is made from step 87 to a logic step 88 where the up/down counter 54 is advanced. From step 88, a transfer is made to a logic step 89 of a logic state S2.

If a leading edge of a character segment is detected at step 89, a transfer is made to a logic step 90 where the segment counter 63 is incremented and the segment length counter 65 is loaded with a one value. If a leading edge is not detected at step 89, a transfer is made to a logic step 91 to detect the presence of a black cell. If a black cell is present, a transfer is made from step 91 to a logic step 92 where the segment length counter 65 is incremented. If a black cell is not present, however, a transfer is made from step 91 to a logic step 93 where a shift clock signal is issued to shift register 51.

From steps 90 or 92, a transfer is made to a logic step 94 to test for the presence of a trailing edge of a segment. If a trailing edge is present, a transfer is made from step 94 to a logic step 95 where the column counter 61 is loaded into the segment position counter 67. A transfer then is made from step 95 to step 93 to generate a shift clock signal. If a trailing edge is not detected, a transfer is made from step 94 to step 93 without executing step 95.

From step 93, a transfer is made to a logic step 96 where the column counter 61 is incremented and the up/down counter 54 is advanced. A transfer then is made from step 96 to a logic step 97 to determine whether the last cell in a row of character buffer 27 has been processed. If not, the decision flow recycles along a logic path 98 to remain in state S2 until the last cell of a row is detected. Upon detecting the last cell in a row, a transfer is made from step 97 to a logic step 99 where a next feature signal is generated on line 43. A transfer then is made from step 99 to a logic step 100 of a logic state S3.

At step 100, the decision flow cycles about a logic path 101 until a feature analyzed signal is received on line 44 from processor 25. Upon receiving a feature analyzed signal, a transfer is made from step 100 to a logic step 102 where counters 63, 65 and 67 are reset. In addition, a clock pulse is generated on line 37 to advance the character buffer 27 by one row, shift register 51 is cleared, and the row counter 59 is incremented. From step 102, a transfer is made to a logic step 103 where line 78 is sensed to determine the scan direction. If a left to right character scan is indicated, a transfer is made from step 103 to a logic step 104 where up/down counter 54 is loaded with an eleven value. If a right to left scan is indicated, a transfer is made from step 103 to a logic step 105 where counter 54 is cleared. From steps 104 or 105, a transfer is made to a logic step 106 where the count of the row counter 59 is sensed. If the count is less than nineteen, a transfer is made from state S3 to step 87 of state S1. If the count is equal to nineteen, however, a transfer is made from step 106 to a logic step 107 of a logic state S4.

The character buffer 27 is advanced at step 107 for a column analysis. Since the buffer 27 in the embodiment as described herein is comprised of two IC chips each having six thirty-two bit shift registers, the buffer is advanced twelve rows to reposition the top of the character image at the second row from the top of the buffer. The row counter 59 then is incremented, and a transfer is made from step 107 to a logic step 108 where the row count is sensed from a count of 31. If the row count is equal to 31, a transfer is made from step 108 to a logic step 109 of a logic state S5. If the row count is less than 31, the logic decision flow reenters state S4 at step 107.

At step 109 of state S5, a shift clock signal is issued to the shift register 51, and the character buffer 27 is advanced one row. Further, the row counter 59 is incremented and a transfer is made from step 109 to a logic step 110 of a logic state S6.

If the presence of a leading edge of a character segment is detected at step 110, a transfer is made from step 110 to a logic step 111 where the segment counter 63 is incremented and the segment length counter 65 is loaded with a one value. If no leading edge is detected at step 110, however, a transfer is made from step 110 to a logic step 112 to test for the presence of a black cell. If a black cell is detected, a transfer is made from step 112 to a logic step 113 where the segment length counter 65 is incremented by one. Fom steps 111 or 113, a transfer is made to a logic step 114 where the character buffer 27 is advanced one row. If neither a leading edge nor a black cell is detected, a transfer is made from step 112 to logic step 114.

From step 114, a transfer is made to a logic step 115 to issue a shift clock pulse on line 51b to shift register 51. A transfer then is made to a logic step 116 to sense the count of a row counter 59. If the row count is equal to nineteen, a transfer is made from step 116 to a logic step 117 where the row counter 59 is incremented and a next feature signal is issued on line 43 to the feature decision processor 25. From step 117, a transfer is made to a logic step 118 of a logic state S7. If the row count is not equal to nineteen, a transfer is made from step 116 to a logic step 119 where the row counter is incremented by one. From step 119, the logic decision flow reenters state S6 a step 110.

At step 118 of state S7, the character buffer 27 is advanced one row and the row counter 59 is incremented by one. A transfer then is made from step 118 to a logic step 120 to sense the row count. If the row count is equal to 31, a transfer is made from step 120 to a logic step 121 of a logic state S8. Otherwise, the logic decision flow reenters state S7 at step 118.

At step 121 of state S8, the logic decision flow cycles about a logic path 122 until a feature analyzed signal on line 44 is received from the feature decision processor 25. A transfer then is made from step 121 to a logic step 123 to determine whether the last column of character buffer 27 has been processed. If the last column has been processed, a transfer is made from step 123 to a logic step 124 where the logic unit 56 is disabled and a transfer is made to step 81 of state S0. If the last column has not been processed, a transfer is made from step 123 to a logic step 125 where the column counter 61 is incremented by one and the shift register 51 is cleared. In addition, counters 63 and 65 are cleared, and the up/-down counter 54 is incremented. A transfer then is made from step 125 to state S5 at step 109 where the logic decision process continues as before described.

FIG. 5

Figure 5:
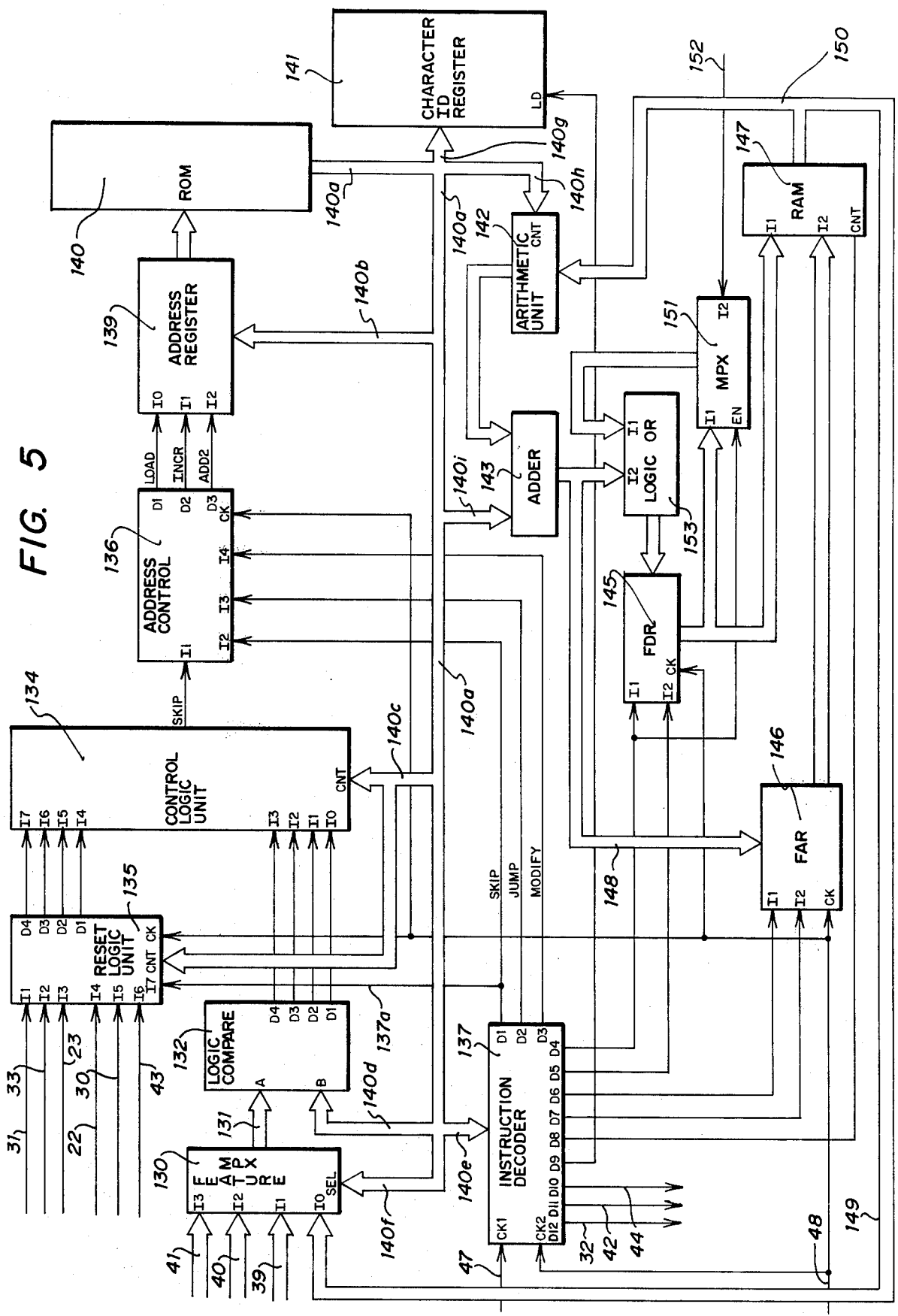
FIG. 5 is a detailed functional block diagram of the feature decision processor of FIG. 1.

FIG. 5 is a detailed functional block diagram of the feature decision processor 25 of FIG. 1.

The I1-I3 inputs of a four-to-one multiplexer 130 are connected to data lines 39, 40 and 41, respectively. Each of the data lines 39-41 comprises four binary coded data lines. The output of multiplexer 130 is connected by way of data lines 131 to the A input of a logic compare unit 132.

Logic compare unit 132 provides four outputs D1-D4 respectively indicating whether the A input is less than the B input to unit 132, whether the A input is greater than the B input, whether the A input is equal to the B input and whether logic one bits occur at the same bit field position in the A input as in the B input. The D1-D4 outputs of unit 132 are connected to the I0-I3 inputs, respectively, of a skip control logic unit 134.

The I4-I7 inputs of unit 134 are connected to the D1-D4 outputs, respectively, of a reset logic unit 135. The output of logic unit 134 is connected to the I1 input of an address control unit 136.

The I1 input of reset logic unit 135 is connected to line 31 leading from vertical location logic unit 19 of FIG. 1, and the I2 input is connected to line 33. Further, the I3 input is connected to line 23, the I4 input is connected to line 22, the I5 input is connected to line 30 and the I6 input is connected to line 43 of FIG. 1. Reset logic unit 135 also receives a skip instruction signal at its I7 input from an instruction decoder 137 by way of a control line 137a, and a first clock pulse from timing logic 45 by way of control line 48.

The I2-I4 inputs to address control unit 136 are respectively connected to the D1-D3 outputs of instruction decoder 137. The clock input (CK) of control unit 136 is connected to timing logic 45 by way of control line 48. The D1-D3 outputs of control unit 136 are connected to the I0-I2 inputs of an address register 139. The output of register 139 is connected to the input of a 1.0 K bit by twelve bit ROM 140 having stored therein the instruction set controlling the operation of feature decision processor 25.

The output of ROM 140 is connected by way of data lines 140a and data lines 140b to the data input of address register 139, by way of lines 140a and data lines 140c to the control inputs (CNT) of skip control logic 134 and reset logic unit 135, and by way of lines 140a and data lines 140d to the B input of logic compare unit 132. In addition, the output of ROM 140 is connected by way of lines 140a and data lines 140e to the control input of decoder unit 137, by way of lines 140a and data lines 140f to the select input of multiplexer 130, by way of lines 140a and data lines 140g to the input of a character identification register 141, and by way of lines 140a and data lines 140h to the control input of an arithmetic unit 142. Further, the output of ROM 140 is connected by way of lines 140a and data lines 140i to the A input of an adder 143.

Instruction decoder 137 receives a clock signal at the CK1 input from timing logic 45 by way of control line 47, and a second clock signal at the CK2 input by way of control line 48. The D1 output of decoder 137 also is connected to the I7 input of reset logic unit 135. The D4 and D5 outputs of decoder 137 are connected to the I1 and I2 inputs, respectively, of a feature data register 145, and the D6 and D7 outputs of decoder 137 are connected to the I1 and I2 inputs, respectively, of a feature address register 146. The D8 output of decoder 137 is connected to the control input of a RAM 147, and the D9 output of decoder 137 is connected to the load input of character identification register 141. The D10, D11 and D12 outputs of decoder 137 are connected to lines 44, 42 and 32, respectively.

The data input of feature address register 146 is connected to the output of adder 143 by way of data lines 148. The clock input to register 146 is connected to line 48, and the output of register 146 is applied to the I2 input of RAM 147. The output of RAM 147 is applied by way of data lines 149 to the I0 input of multiplexer 130 and by way of data lines 150 to the data input of arithmetic unit 142. The output of the feature data register 145 is connected to the I1 input of a two-to-one multiplexer 151, and to the I1 input to RAM 147. The enable input of multiplexer 151 is connected to the D4 output of decoder 137, and the I2 input to the multiplexer is tied to a logic zero source 152. The output of the multiplexer 151 is applied to the I1 input of a logic OR unit 152, the I2 input of which is connected to the output of adder 143. The output of unit 153 is connected to the data input of feature data register 145, and the clock input of register 145 is connected to line 48.

The feature decision processor 25 is a microprocessor which has been tailored for the character recognition system as described herein. In operation, multiplexer 130 receives three four bit inputs from the row-column analyzer 35, and a four bit input from RAM 147. The inputs from analyzer 35 comprise the primary feature data of a character image stored in character buffer 27. The input from RAM 147 comprises secondary feature data derived from the primary feature data.

The multiplexer 130 is selected to one of inputs I0–I3 by control bits nine and eight of an instruction received from ROM 140 by way of data lines 140a and 104f. The output of multiplexer 130 is supplied to the A input of logic compare unit 132 which also receives at its B input data bits zero through three of the instruction issued by ROM 140. Unit 132 compares the A and B inputs to indicate whether they are equal, which is the greater or whether the logic one bit positions in the A input are mirrored by logic one positions in the B input.

For purposes of illustration, reference now shall be made to F1 and F2 instruction fields, and to skip, jump and modify instructions which later are explained in detail.

Reset logic unit 135 stores the next feature signal, the next character signal, the character space signal, the character reject signal, the timing fault reject signal and the vertical position reject signal as received. Upon the occurrence of a skip instruction at the 17 input from the instruction decoder 137 and an F1 instruction field as represented by bits four through six from ROM 140, unit 135 provides a next feature status signal, a next character status signal, a character space status signal, and a reject status signal at the D1–D4 outputs, respectively.

The operation of the skip control logic unit 134 is controlled by bits four through seven of an instruction issued by ROM 140. Such bits specify an F1 or an F2 instruction field and specify the test to be conducted. Skip control unit 134 may perform each of the condition tests specified for either an F1 instruction field or an F2 instruction field. For example, if an F1 instruction field is specified for an equivalence test and the equivalence line from logic compare unit 132 is high, then a skip condition is issued by control unit 134 to address control unit 136.

Control unit 136 also receives skip, jump and modify instructions from instruction decoder 137 at the I2-I4 inputs, respectively. When the skip condition is indicated by skip control logic unit 134 and a skip instruction is received from the instruction decoder 137, the address control unit 136 issues a pulse to the I2 input of address register 139 to increment the register by two. If a skip condition is not indicated, and a skip instruction is received or a modify instruction is being executed, unit 136 issues a pulse to the I1 input of register 139 to increment by one. If a jump instruction is being executed with no skip condition indicated, control unit 136 issues a pulse to the I0 input of register 139 to load bits zero through nine of an instruction issued by ROM 140.

The ten bit output of address register 139 addresses the ROM 140, which in response thereto issues an instruction to data lines 140a. More particularly, bits eight and nine of the instruction are supplied to multiplexer 130, bits seven through eleven are supplied to the instruction decoder 137, and bits zero through three are supplied to the B input of the logic compare unit 132. In addition, bits four through seven are supplied to the skip control logic unit 134, bits zero through four are supplied to the A input of adder 143, and bits zero through nine are supplied to the data input of address register 139. Further, bits zero through six are supplied to character identification register 141 and bits five and six are supplied to arithmetic unit 142.

Instruction decoder 137 determines from bits seven through eleven of an instruction whether a skip, jump, or modify command has occurred. If a modify command is received, the instruction decoder subdivides the instruction to generate an analysis complete signal on line 32, a begin analysis signal on line 42, or a feature analyzed signal on line 44. In addition, decoder 137 provides a load signal at the D9 output to load bits zero through six of an instruction into character identification register 141 when a character has been identified, and a load signal at the D7 output to load the feature address register 146 with the output of adder 143. Further, a load followed by a write signal is provided at the D6 output of decoder 137 and supplied to the feature address register 144, and a load signal is provided at the D5 output to load feature data register 145. In addition, an OR command is provided at the D4 output to control the register 145 and the multiplexer 151 in an OR'ing operation.

Upon receipt of a load or a load followed by a write command, the feature address register 146 is updated by the output of adder 143. The five bit output of the feature address register addresses the RAM 147, which is a thirty-two word RAM with four bits per word. The secondary horizontal and vertical feature data as well as control functions are stored in RAM 147, the output of which is forwarded to multiplexer 130 and arithmetic unit 142. The organization of RAM 147 is tabulated in Table I.

TABLE I

| | RAM ORGANIZATION | |
|---|---|---|
| OCTAL LOCATION | VARIABLE(S) | DEFINITION |
| 0 | M | Horizontal Segment Count |
| 1 | HQ(1) | First Detected Horiz. Segment |
| 2 | HQ(2) | Second Detected Horiz. Segment |
| 3 | HQ(3) | Third Detected Horiz. Segment |

TABLE I-continued

RAM ORGANIZATION

| OCTAL LOCATION | VARIABLE(S) | DEFINITION |
|---|---|---|
| 4 | HQ(4) | Fourth Detected Horiz. Segment |
| 5 | HQ(5) | Fifth Detected Horiz. Segment |
| 6 | HQ(6) | Sixth Detected Horiz. Segment |
| 7 | HQ(M) | Last Detected Horiz. Segment |
| 10 | — | Spare |
| 11 | Z101, Z102, Z108, Z109 | Secondary Horiz. Features |
| 12 | Z110, Z113, Z115, Z116 | Secondary Horiz. Features |
| 13 | Z111, Z118 | Secondary Horiz. Features |
| 14 | IX | State Register |
| 15 | H | State Count |
| 16 | —Spare | |
| 17 | HT | Character Height |
| 20 | N | Vertical Segment Count |
| 21 | VQ(1) | First Detected Vert. Segment |
| 22 | VQ(2) | Second Detected Vert. Segment |
| 23 | VQ(3) | Third Detected Vert. Segment |
| 24 | VQ(4) | Fourth Detected Vert. Segment |
| 25 | VQ(5) | Fifth Detected Vert. Segment |
| 26 | VQ(6) | Sixth Detected Vert. Segment |
| 27 | VQ(N) | Last Detected Vert. Segment |
| 30 | — | Spare |
| 31 | Z103, Z104, Z105, Z112 | Secondary Vert. Features |
| 32 | Z114 | Secondary Vert. Features |
| 33 | SLCTR | Segment Length Count |
| 34, 35 | ROCTR | Row Count |
| 36 | CLCTR | Column Count |

Arithmetic unit 142 operates under the control of bits five and six of instructions issued by ROM 140. Depending upon the bit configuration, the arithmetic unit 142 may transfer the RAM 147 data without modification, invert the data on a bit by bit basis or force the output of the arithmetic unit to be an all logic zero or an all logic one output. The four bit output of the arithmetic unit is forwarded to the B input of adder 143. The A and B inputs of adder 143 are added and the sum forwarded to logical OR unit 153 and to the feature address register 146.

Unit 153 also receives a four bit input from multiplexer 151 which is selected to either a logic zero source or to the output of feature data register 145. The output of unit 153 is applied to register 145. The output of register 145 in turn is applied to RAM 147 and to the multiplexer 151.

Upon the occurrence of a load command, the register 145 is loaded with the output of unit 153. Upon the occurrence of an OR command, multiplexer 151 is selected to the output of register 145. Unit 153 thereupon OR's the multiplexer output with the output of adder 143 and applies the result to register 145.

When an OR command or a load command is issued to feature data register 145, or a load followed by a write command is issued to feature address register 146, instruction decoder 137 issues a write command to RAM 147. The contents of register 145 then are loaded into the address location indicated by register 146.

The instruction set controlling the operation of feature decision processor 25 is stored in ROM 140. Each of the instructions is a twelve bit word comprised of command fields, instruction fields and data fields as shown in Tables II-VI.

TABLE II

| INSTRUCTION | MNE-MONIC | INSTRUCTION BITS | | | | | | | | | | |
|---|---|---|---|---|---|---|---|---|---|---|---|---|
| | | 11 | 10 | 9 | 8 | 7 | 6 | 5 | 4 | 3 | 2 | 1 | 0 |
| 1. Skip | SKP | 0 | 0 | 0 | 0 | | F1 | | | x | x | x | x |
| 2. Test Feature Data | SKF | 0 | 0 | 0 | 0 | | F2 | | | | D1 | | |
| 3. Test Number of Segments | SKN | 0 | 0 | 0 | 1 | | F2 | | | | D1 | | |
| 4. Test Segment Length | SKL | 0 | 0 | 1 | 0 | | F2 | | | | D1 | | |
| 5. Test Segment Coordinate | SKC | 0 | 0 | 1 | 1 | | F2 | | | | D1 | | |
| 6. Jump | JMP | 0 | 1 | | | | LABEL | | | | | | |
| 7. Modify Feature Data Register 145 and load into RAM 147 | MDL | 1 | 0 | 0 | 0 | 0 | F3 | | | | D2 | | |
| 8. OR Adder 143 with Feature Data Register 145 | MDO | 1 | 0 | 0 | 0 | 1 | F3 | | | | D2 | | |
| 9. Modify Feature Address Register 146 | MAL | 1 | 0 | 0 | 1 | 0 | F3 | | | | D2 | | |
| 10. Modify Feature Address Register 146 and load Feature Data Register 145 into Specified Address of RAM 147 | MAW | 1 | 0 | 0 | 1 | 1 | F3 | | | | D2 | | |
| 11. Load Character Identification Register 141 with D3 Field | MID | 1 | 0 | 1 | 0 | 0 | | | D3 | | | | |
| 12. Issue Status Signal | MCT | 1 | 0 | 1 | 0 | 1 | | | D3 | | | | |
| 13. Halt | HLT | 1 | 0 | 1 | 1 | 1 | x | x | x | x | x | x | x |

TABLE III

| CONDITION TESTED | F1 Field | | | |
|---|---|---|---|---|
| Next Feature | 0 | 1 | 0 | 0 |
| Next Character | 0 | 1 | 0 | 1 |
| Space | 0 | 1 | 1 | 0 |
| Reject | 0 | 1 | 1 | 1 |
| No Next Feature | 1 | 1 | 0 | 0 |
| No Next Character | 1 | 1 | 0 | 1 |
| No Space | 1 | 1 | 1 | 0 |
| No Reject | 1 | 1 | 1 | 1 |

TABLE IV

| TEST PERFORMED | F2 FIELD | | | |
|---|---|---|---|---|
| Equal | 0 | 0 | 0 | 0 |
| Greater | 0 | 0 | 0 | 1 |
| Less | 0 | 0 | 1 | 0 |
| Bit Position Match | 0 | 0 | 1 | 1 |
| Not Equal | 1 | 0 | 0 | 0 |
| Not Greater | 1 | 0 | 0 | 1 |
| Not Less | 1 | 0 | 1 | 0 |
| No Bit Position Match | 1 | 0 | 1 | 1 |

TABLE V

| OPERATION | F3 FIELD |
|---|---|
| Inversion | 0 0 |
| True | 0 1 |
| Minus One | 1 0 |
| Zero | 1 1 |

TABLE VI

| STATUS SIGNAL | D3 | | | |
|---|---|---|---|---|
| Feature Analyzed | 0 | 0 | 0 | 0 |
| Begin Analysis | 0 | 0 | 0 | 1 |

TABLE VI-continued

| STATUS SIGNAL | D3 | | | |
|---|---|---|---|---|
| Analysis Complete | 0 | 0 | 1 | 0 |

Referring to Table II, a skip instruction occurs when an instruction word of ROM 140 is comprised of logic zeros in bit positions eight through eleven, and an F1 instruction field in bit positions four through seven. Bit positions zero through three are inconsequential as represented by X's therein. The command field occupying bit positions eight through eleven indicates that a skip instruction is to be executed, and the F1 instruction field indicates the condition to be tested. If the condition is true, the next memory location in ROM 140 is skipped. For example, referring to Table III, if a skip instruction is being executed and the F1 instruction field is represented by logic zeros in bit positions four, five and seven and a logic one in bit position six, then the next instruction in ROM 140 is skipped if a next feature signal is sensed on line 43 leading from row-column analyzer 35.

The SKF, SKN, SKL and SKC instructions each are represented by a command field occupying bit positions eight through eleven, by an F2 instruction field in bit positions four through seven and by a D1 data field in bit positions zero through three. The command fields indicate the test to be made. As shown in Table IV, the F2 instruction field specifies the type of test that is to take place. For example, logic zeros in bit positions eight through eleven indicate that feature data from RAM 147 is to be compared with the data contained in the data field. The comparison test to be made is specified by the contents of the F2 field.

A jump instruction is indicated by a command field occupying bit positions ten and eleven, with a logic one in bit position ten and a logic zero in bit position eleven. The label field occupying bit positions zero through nine comprises a mnemonic code referring to a particular address in ROM 140 to which the logic decision process transfers.

The instructions MDL, MDO, MAL and MAW each are represented by instruction words having a command field in bit positions seven through eleven, by an F3 instruction field in bit five and six and by a D2 data field in bit positions zero through four. In each of the instructions, the F3 instruction field specifies the type of modification that is to be performed upon the feature data from RAM 147 and which will be added to the contents of the D2 data field. For example, as shown by Table V, logic zeros in bit positions five and six indicate that each bit of the RAM 147 data is to be inverted and added to the contents of the D2 data field. A logic one in bit position five and a logic zero in bit position six indicate that no modification is to occur. Further, a logic zero in bit position five and a logic one in bit position six indicate that a minus one will be added to the contents of the D2 data field, and logic ones in bit positions five and six indicate that zeros will be added to the D2 data field.

The MDL instruction provides that the modification designated by the F3 instruction field shall be performed upon the data stored in feature data register 145, and that the modified data added to the contents of the D2 field shall be loaded into RAM 147. Instruction MDO provides for the output of adder 143 to be OR'd with the data stored in the feature data register 145, such OR'ing to be performed by the logical OR unit 153. The MAL instruction provides for a modification of the address stored in the feature address register 146. The MAW instruction provides for an updating of the address stored in the feature address register 146, and for the loading of the data stored in the feature data register 145 into the location of RAM 147 addressed by feature address register 146.

The MID and MCT instructions each are represented by a command field occupying bit positions seven through eleven, and by a D3 data field occupying bit positions zero through six. The MID instruction provides for the loading of the D3 data field into the character identification register 141. The MCT instruction provides for the generation of a status signal as represented by the D3 data field. For example, referring to Table VI, a feature analyzed signal is issued on line 44 when each bit position of the D3 data field is occupied by a logic zero.

The HLT instruction is represented by a command field in bit positions seven through eleven. Bit positions zero through six are inconsequential as represented by the X's therein. When a halt instruction occurs, the feature decision processor 25 ceases to operate.

FIGS. 6A-6C

Figure 6A:
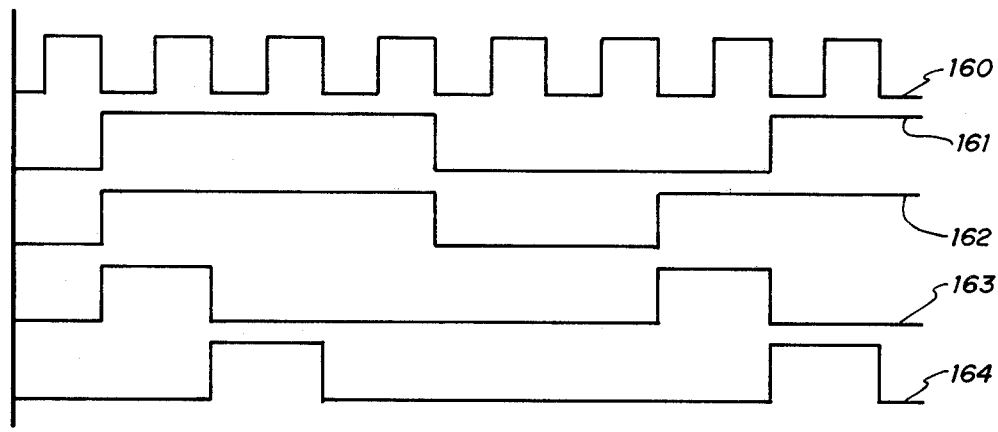
FIGS. 6A-6C are timing diagrams of the operations of the character recognition system of FIG. 1.
Figure 6B:
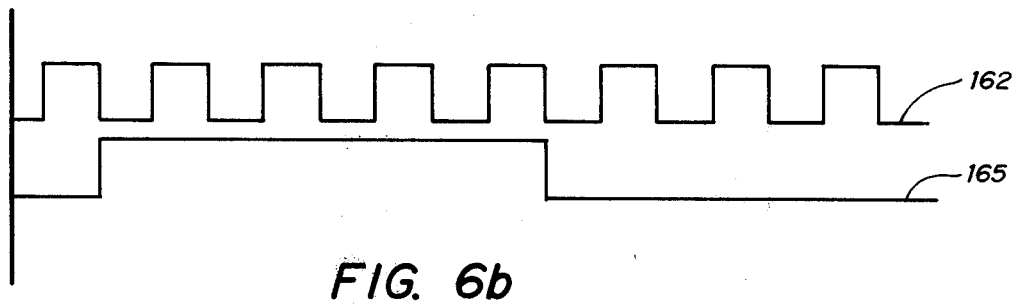
Figure 6C:
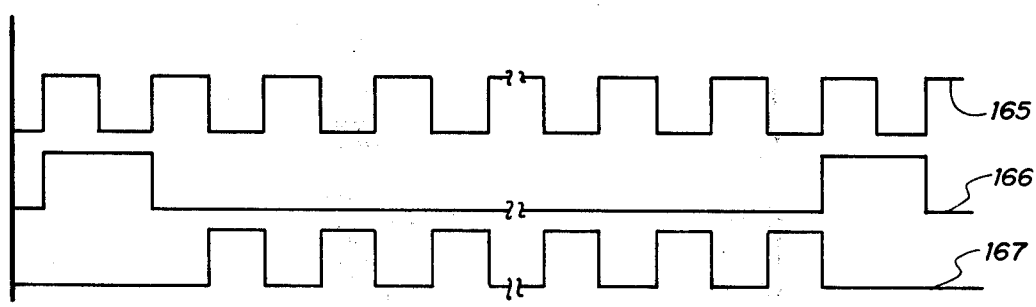

FIGS. 6A-6C are timing diagrams of clock signals controlling the operation of the character recognition system of FIG. 1.

Waveform 160 is an illustration of the 8 MHz output of a crystal oscillator in timing logic 45 of FIG. 1. Waveform 161 illustrates a 1.33 MHz clock signal generated by timing logic 45 on control line 46. Waveform 162 illustrates a 1.6 MHz clock signal generated by timing logic 45 on control line 49, waveform 163 illustrates a 1.6 MHz clock signal generated by timing logic 45 on control line 48, and waveform 164 illustrates a 1.6 MHz clock signal generated by timing logic 145 on control line 47.

Waveforms 161 and 162 are comprised of pulses having 375 nanosecond widths, and waveforms 163 and 164 are comprised of pulses having 125 nanosecond widths. Further, waveform 164 is delayed from waveform 163 by 125 nanoseconds.

Referring to FIG. 6B, waveform 162 is redrawn to a different time scale to provide a transition to FIG. 6C. Waveform 165 is a 20 MHz clock signal comprised of pulses having widths of 2.50 microseconds. Waveform 166 of FIG. 6C illustrates a clock signal issued by video processing logic unit 11 on control line 16 when a vertical scan of the sensor array of video data lift unit 10 has been initiated. Waveform 167 is an illustration of the 20 MHz cell clock of the sensor array. As may be seen from a comparison of waveforms 166 and 167, the first 2.50 microsecond pulse of waveform 167 occurs 12.5 microseconds after the leading edge of a 5 microsecond pulse of waveform 166. After 64 pulses of waveform 167 have occurred, a scanning of the sensor array again is initiated by a pulse of waveform 166 occurring at the trailing edge of the 64th pulse of waveform 167.

FIG. 7

Figure 7:
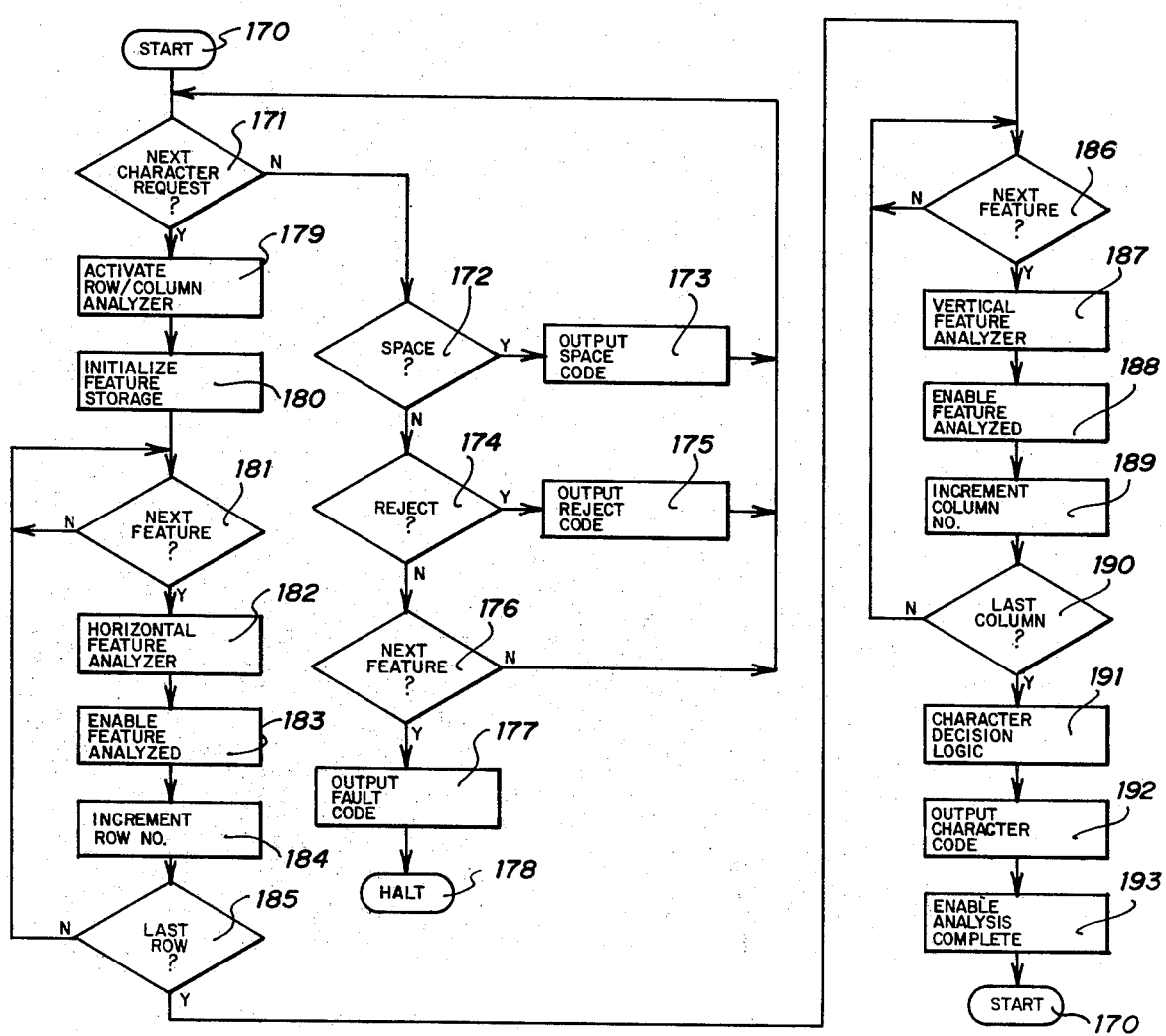
FIG. 7 is a logic decision flow diagram of the feature decision processor of FIG. 5.

FIG. 7 illustrates a logic flow diagram for the operation of the feature decision processor 25.

Upon being enabled, the logic decision process transfers from a wait state at a logic step 170 to a logic step 171 to test for the presence of a next character request from vertical location logic unit 19 on line 30 of FIG. 1. If a next character request is not present, a transfer is made to a logic step 172 to test for the presence of a space indication on line 22 leading from horizontal location logic unit 17. If a space indication is present, a transfer is made from step 172 to a logic step 173 where a space code is generated and a transfer is made to step 171. If the space indication is not present, however, a transfer is made from step 172 to a logic step 174 to test for the presence of a character reject signal on line 23. If a reject signal is present, a transfer is made from step 174 to a logic step 175 where a reject code is generated followed by a transfer to step 171. If a reject signal is not present, however, a transfer is made from step 174 to a logic step 176 to test for the presence of a next feature signal on line 143 of FIG. 1. If a next feature signal is not present, a transfer is made to step 171. If a next feature signal is present, however, a transfer is made from step 176 to a logic step 177 to generate a fault code. Thereafter, the logic decision process is halted at a logic step 178. It is to be understood that when a halt condition occurs, the system must be reinitialized before further operations may occur.

If a next character request signal is detected at step 171, a transfer is made from step 171 to a logic step 179 where the row-column analyzer 35 is initialized with a begin analysis signal on line 42. A transfer then is made from step 179 to a logic step 180 where RAM 147 of FIG. 5 is initialized by clearing all memory locations. From step 180, a transfer is made to a logic step 181 to await the occurrence of a next feature signal from the row-column analyzer 35 indicating that a row of character buffer 27 has been processed, and that the primary feature data including the number of character segments, the segment lengths and the segment coordinates derived therefrom are available. When a next feature signal has been received, a transfer is made from step 181 to a logic step 182 to initiate a horizontal feature analysis. Secondary horizontal features are derived from the primary horizontal features received from row-column analyzer 35 and a transfer is made from step 182 to a logic step 183 where a feature analyzed signal is generated on line 44 leading to the row-column analyzer 35. From step 183, a transfer is made to a logic step 184 to increment a row counter internal to RAM 147. From step 184, a transfer is made to a logic step 185 to sense the row count and thereby determine whether the last row, row 20, of the character buffer 27 has been processed. If so, a transfer is made from step 185 to a logic step 186. If the last row of the character buffer has not been processed, however, a transfer is made from step 185 to step 181 where the logic decision process continues as before described.

At logic 186, a next feature signal from the row-column analyzer 35 is awaited. When the signal is detected, a transfer is made from step 186 to a logic step 187 where a vertical feature analysis is enabled to generate secondary vertical feature from the primary vertical feature received from the row-column analyzer. From step 187 a transfer is made to a logic step 188 to generate a feature analyzed signal on line 44 leading to the rwo-column analyzer 35. From step 188 a transfer is made to a logic step 189 to increment a column counter internal to RAM 147 and a transfer is made to a logic step 190 to sense the column counter and thereby determine whether a last column of the character buffer 35 has been processed. If the last column of the character buffer has not been processed, a transfer is made from step 190 to step 186 where the logic process continues as before described. If a last column has been processed, however, a transfer is made from step 190 to a logic step 191 where a character decision process is enabled. At step 191, the secondary feature data is evaluated to form a character decision, and a transfer is made to a logic step 192 where character code is generated. From step 192 a transfer is made to a logic step 193 to generate analysis complete signal on line 32 leading to the vertical location logic unit 19. From step 193, a transfer is made to step 170 to await the occurrence of a next character request.

Figure 8B:
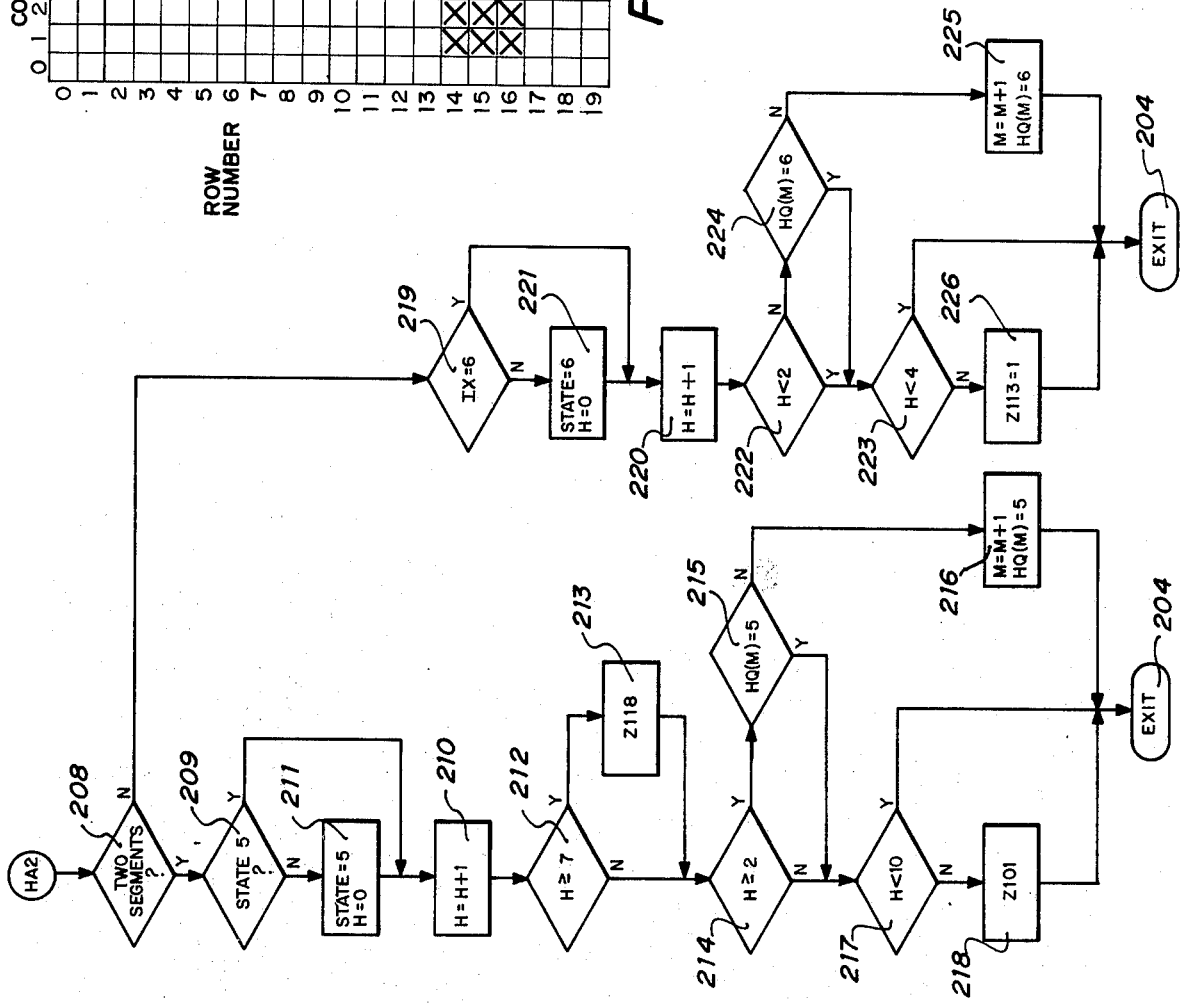
Figure 8B:
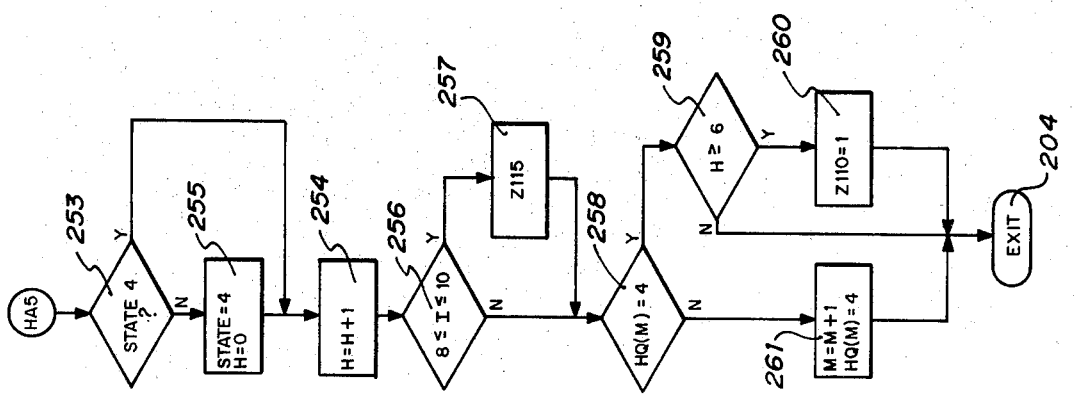

FIGS. 8A and 8B

FIGS. 8A and 8B are logic flow diagrams of the horizontal feature analyzer of FIG. 7.

The horizontal feature analysis of each row of character buffer 27 as performed at step 182 of FIG. 7 provides a set of secondary features which describe the character image. The rows of the character buffer are processed in a sequential manner from top to bottom. The character segments detected in a row are classified into one of the following six categories: (1) short left side segment; (2) short right side segment; (3) medium length segment; (4) long segment; (5) two segments; and (6) three or more segments. A short segment is defined to be less than or equal to five sensor cells in length. A short segment further is classified as a right or left side segment depending upon the coordinate of the rightmost cell of the segment. In the preferred embodiment described herein, a short segment is classified as a right side segment if the rightmost cell of the segment occurs in column nine, ten or eleven of the character buffer. If the rightmost cell occurs to the left of those columns, the short segment is classified as a left side segment. A medium length segment is either six, seven or eight cells in length, and a long segment is nine or more cells in length.

Each of the six character segment classifications may be considered to be logic states, each having a set of rules for the generation of secondary features. Generally, the rules describe the conditions which must be satisfied for a logic state to be entered in the generation of secondary features. Table VII provides a tabulation of the secondary features derived during a horizontal analysis.

TABLE VII

| SYMBOL | SECONDARY FEATURE |
|---|---|
| HQ(1) | First Detected Horizontal Segment |
| HQ(2) | Second Detected Horizontal Segment |
| HQ(3) | Third Detected Horizontal Segment |
| HQ(4) | Fourth Detected Horizontal Segment |
| HQ(5) | Fifth Detected Horizontal Segment |
| HQ(6) | Sixth Detected Horizontal Segment |
| HQ(M) | Last Detected Horizontal Segment |
| M | Number of Horizontal Segments Detected |
| Z101 | More than 10 consecutive rows with 2 segments |
| Z102 | One of the first thirteen rows of char. buffer with exception of row 0 found containing no segments |
| Z109 | Six or more consecutive rows with medium length segments |
| Z110 | Six or more consecutive rows with long segments |
| Z111 | Five or more consecutive rows with short right side segments |
| Z113 | Three or more consecutive rows with three or more segments |
| Z115 | A long segment found in row 8, 9, or 10 of the Char. Buffer |
| Z116 | Five or more consecutive rows with short left side segments |
| Z118 | Seven or more consecutive rows with two segments |

The two categories of feature sets shown in Table VII are HQ features and Z features. The HQ features represent those character segments detected in the row by row analysis of character buffer 27. The Z features provide an additional measure of the interrelationship between the detected segments.

The HQ features are indexed from one to six to indicate the sequence in which the horizontal segments were detected. Typically, three to five HQ features are derived in the processing of each character image. An HQ feature further is assigned a state value from one to six in accordance with conditions provided in a set of rules for assigning the values. More particularly, an HQ feature is assigned the state value of one if four or more consecutive short left side segments occur, and the short left side segment is the first segment type detected in the horizontal analysis of a character image. A state value of one also is assigned if two or more consecutive short left side segments occur, and the short left side segment is not the first segment type detected.

An HQ feature is assigned the state value of two if four or more consecutive short right side segments occur, and the short right side segment is the first segment type detected. A state value of two also is assigned if two or more consecutive short right side segments occur, and the short right side segment is not the first segment type detected. A state value of three is assigned to an HQ feature if one medium length segment occurs, and the preceding HQ feature had a state value other than four. A state value of four is assigned when one long segment occurs. Further, an HQ feature is assigned the state value of five when two consecutive rows with two segments in each row occur. In addition, an HQ feature is assigned the state value of six when three consecutive rows with three or more character segments in each row occur.

The horizontal feature analysis as illustrated by FIG. 7 is initiated at a logic step 200 from which a transfer is made to a logic step 201 to test for the presence of a character segment. If a character segment is not present, a transfer is made from logic step 201 to a logic step 202 to determine whether the row (I) that is being processed is between rows one and twelve inclusive. If the row is between one and twelve, then a transfer is made from step 202 to a logic step 203 to indicate the existence of a Z102 feature. A reject condition is stored in RAM 147 and a transfer is made from step 203 to a logic step 204 to discontinue the horizontal feature analysis and transfer to logic step 183 of FIG. 7. If the current row is not between rows one and twelve inclusive, a direct transfer is made from step 202 to step 204.

If a character segment is present, a transfer is made from step 201 to a logic step 205 where a character height counter of RAM 147 is incremented by one. From step 205 a transfer is made to a logic step 206 to test for the number of segments in the character buffer row being processed. If only a single segment is detected, a transfer is made from step 206 to a logic step 207. If more than one segment is detected, however, a transfer is made to a logic step 208 to test for the presence of two character segments in the row being processed. If two character segments are present, a transfer is made from step 208 to a logic step 209 where a state register is sensed to determine the current state of the analysis. If the state register indicates that the logic decision process is currently in state five, a transfer is made from step 209 to a logic step 210 where a state counter (H) is incremented by one. If the state register indicates other than a state five, however, a transfer is made from step 209 to a logic step 211 where the state register is set to indicate a state five and the state counter is reset. A transfer is made from step 211 to step 210.

From step 210, a transfer is made to a logic step 212 where the state counter is compared to a count of seven. If the current count is greater than or equal to seven, a transfer is made from step 212 to a logic step 213 where the occurrence of secondary feature Z118 is indicated in RAM 147 and a transfer is made to a logic step 214. If the state counter has a count of less than seven, however, a transfer is made from step 212 to step 214.

At step 214, the count of the state counter is compared to the number two. If the current count is greater than or equal to the number two, a transfer is made from step 214 to a logic step 215 where the state value of the last detected horizontal segment is compared to the number five. If the state value does not equal five, a transfer is made from step 215 to a logic step 216 to increment a horizontal segment counter (M) and to set the state value of the last detected horizontal segment to five. A transfer then is made from step 216 to step 204. If the state value of the last detected horizontal segment at step 215 is equal to five, a transfer is made from step 215 to a logic step 217. Further, if the count of the state counter is less than two, a transfer is made from step 214 to logic step 217 where the count of the state counter is compared to the number ten. If the count is less than ten, a transfer is made from step 217 to step 204. If the count is greater than or equal to ten, however, a transfer is made from step 217 to a logic step 218 where the occurrence of a Z101 secondary feature is indicated in RAM 147. From step 218 a transfer is made to step 204.

Referring again to logic step 208, a transfer is made from step 208 to a logic step 219 if two character segments are not detected. At step 219, the state register is sensed for a state 6 indication. If a state 6 is detected, a transfer is made from step 219 to a logic step 220 where the state counter is incremented by one. If state register indicates a state other than state 6, a transfer is made from step 219 to a logic step 221 where the state register is set with a state 6 indication and the state counter is reset. A transfer then is made from step 221 to step 220. From step 220 a transfer is made to a logic step 222 where the count of the state counter is compared to the number 2. If the current count is less than two, a transfer is made from step 222 to logic step 223. If the current count is not less than two, however, a transfer is made from step 222 to a logic step 224 where the state value of the last detected horizontal segment is compared to the number 6. If the state value is equal to 6, a transfer is made from step 224 to logic step 223. If the state value is not 6, however, a transfer is made from step 224 to a logic step 225 where the segment counter is incremented by one and the last detected horizontal segment is assigned a state value of six. A transfer then is made from step 225 to step 204.

At step 223, if the state counter has a current count greater than or equal to four, a transfer is made from step 223 to step 204. If the current count is greater than or equal to the four, however, a transfer is made from step 223 to a logic step 226 where the occurrence of secondary feature Z113 is indicated in RAM 147. From step 226, a transfer is made to step 204.

Referring again to step 207, the count of a character segment length counter (L) is compared to the number 5. If a count greater than five is detected, a transfer is made from step 207 to a logic step 227. If the indicated character segment length is less than or equal to five, however, a transfer is made from step 207 to a logic step 228. At step 28, a test is made to determine whether the rightmost coordinate of the character segment is to the right or left of column nine of the character buffer 27. If to the left, a transfer is made from step 228 to a logic step 229 where the state register is examined. If a state 1 is indicated, a transfer is made from step 229 to a logic step 230. If a state other than state 1 is indicated, however, a transfer is made from step 229 to a logic step 231 where the state register is set with a state 1 indication and the state counter is reset. From step 231 a transfer is made to step 230 where the state counter is incremented by one.

From step 230, a transfer is made to a logic step 232 where the current count of the state counter is compared to the number 5. If the current count is greater than or equal to five, a transfer is made from step 232 to a logic step 233 where the occurrence of secondary feature Z116 is indicated in RAM 147 and a transfer is made to a logic step 234. If the current count of the state counter is less than five, however, a transfer is made from step 232 to step 234.

At step 234, the value of the last detected horizontal segment is compared to the number 1. If the value is equal to one, a transfer is made from step 234 to step 204. If the value is other than one, however, a transfer is made from step 234 to a logic step 235 where the current count of the state counter is compared to the number 2. If the current count is less than two, a transfer is made from step 235 to step 204. If the current count is greater than or equal to two, however, a transfer is made from step 235 to a logic step 236. At step 236, the character segment counter is incremented by one and the last detected horizontal segment is assigned a state value of one. A transfer then is made from step 236 to step 204.

Referring again to step 228, if the rightmost coordinate of a character segment is greater than or equal to that of column nine, a transfer is made from step 228 to a logic step 237 where the state register is examined for a state 2 indication. If a state 2 is detected, a transfer is made from step 237 to a logic step 238. If a state other than state 2 is indicated, a transfer is made from step 237 to a logic step 239 where the state register is set to indicate state 2 and the state counter is reset. A transfer then is made from step 239 to step 238. At step 238, the state counter is incremented by one and a transfer is made to a logic step 240.

At step 240, the current count of the state counter is compared to the number 5. If the current count is greater than or equal to five, a transfer is made from step 240 to a logic step 241 where the occurrence of the secondary feature Z111 is indicated in RAM 147. A transfer then is made from step 241 to a logic step 242. If the current count of the state count is less than five, however, a transfer is made from step 240 to step 242. At step 242, the state value of the last detected horizontal segment is compared to the number 2. If the state value is equal to two, a transfer is made from step 242 to step 204. If the state value is not equal to two, however, a transfer is made from step 242 to a logic step 243 where the current count of the state counter is compared to the number two. If the current count is less than two, a transfer is made from step 243 to step 204. If the current count is greater than or equal to two, however, a transfer is made from step 243 to a logic step 244 where the segment counter is incremented by one and the last detected horizontal segment is assigned a state value of two. A transfer then is made from step 244 to step 204 to discontinue the horizontal analysis.

Referring again to logic step 227, the count of the character segment length counter is examined to determine whether the current count is greater than 5 but less than or equal to 8. If so, a transfer is made from step 227 to a logic step 245 where the state register is examined for a state 3 indication. If the indicated state is state 3, a transfer is made from step 245 to a logic step 246 where the state counter is incremented by one. If the current state is not state 3, however, a transfer is made from step 245 to a logic step 247 where the state register is set to indicate state 3 and the state counter is reset. A transfer then is made from step 247 to step 246.

From step 246, a transfer is made to a logic step 248 where the value of the last detected horizontal segment is compared to the number 3. If the state value is equal to three, a transfer is made from step 248 to a logic step 249. If the state value is not equal to three, however, a transfer is made from step 248 to a logic step 250 where the state value of the last detected horizontal segment is compared to the number 4. If the state value at step 250 is equal to four, a transfer is made from step 250 to step 249 where the current count of the state counter is compared to the number 6. If the current count is greater than or equal to six, a transfer is made from step 249 to a logic step 251 where the occurrence of secondary feature Z109 is indicated in RAM 147 and a transfer is made to step 204. If the current count of the state counter is less than six, however, a transfer is made from step 249 to step 204.

If the state value of the last detected horizontal segment at step 250 is not equal to four, a transfer is made from step 250 to a logic step 252 where the segment counter is incremented by one and the last detected horizontal segment is assigned a state value of three. A transfer then is made from step 252 to step 204.

If a long character segment is indicated at step 227, a transfer is made from step 227 to a logic step 253 where the state register is examined for a state 4 indication. If a state 4 is detected, a transfer is made from step 253 to a logic step 254 where the state counter is incremented by one. If a state other than a state 4 is indicated, however, a transfer is made from step 253 to a logic step 255 where the state register is set to indicate a state 4 and the state counter is reset. From step 255 a transfer is made to step 254.

From step 254, a transfer is made to a logic step 256 where a test is made to determine whether the current row of the character buffer 27 is between rows eight and ten. If the current row is between rows eight and ten, a transfer is made from step 256 to a logic step 257 where the occurrence of secondary feature Z115 is indicated in RAM 147. A transfer then is made from step 257 to a logic step 258. If the current row number is not between rows eight and ten, however, a transfer is made from step 256 to step 258.

At step 258, the state value of the last detected horizontal segment is compared to the number 4. If the state value is equal to four, a transfer ia made from step 258 to a logic step 259 where the current count of the state counter is compared to the number 6. If the current count is less than six, a transfer is made from step 259 to step 204. If the current count is greater than or equal to six, however, a transfer is made from step 259 to a logic step 260 where the occurrence of the secondary feature Z110 is indicated in RAM 147. A transfer then is made from step 260 to step 204. If the state value of the last detected horizontal segment at step 258 is not equal to four, a transfer is made from step 258 to a logic step 261 where the segment counter is incremented by one and the last detected horizontal segment is assigned the number four. A transfer then is made from step 261 to step 204.

FIGURE 9

Figure 9:
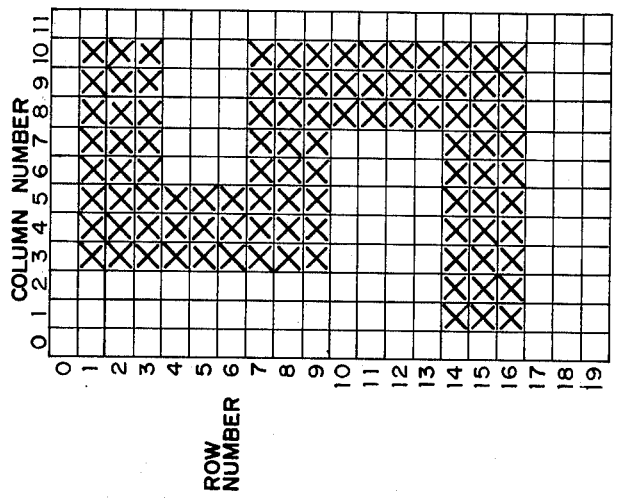
FIG. 9 is an illustration of an electrical character image.

FIG. 9 illustrates a character image of the number five as positioned in a mosaic of character buffer 27.

As before stated, the primary feature of a character image are the number of segments in each row and column, the lengths of such segments, and the rightmost coordinate of the segments appearing in each row. The primary features for the character image of FIG. 9 are tablulated in Table VIII. The secondary features that are derived during a horizontal analysis of the character image are tabulated in Table IX.

FIGURE 10

Figure 10:
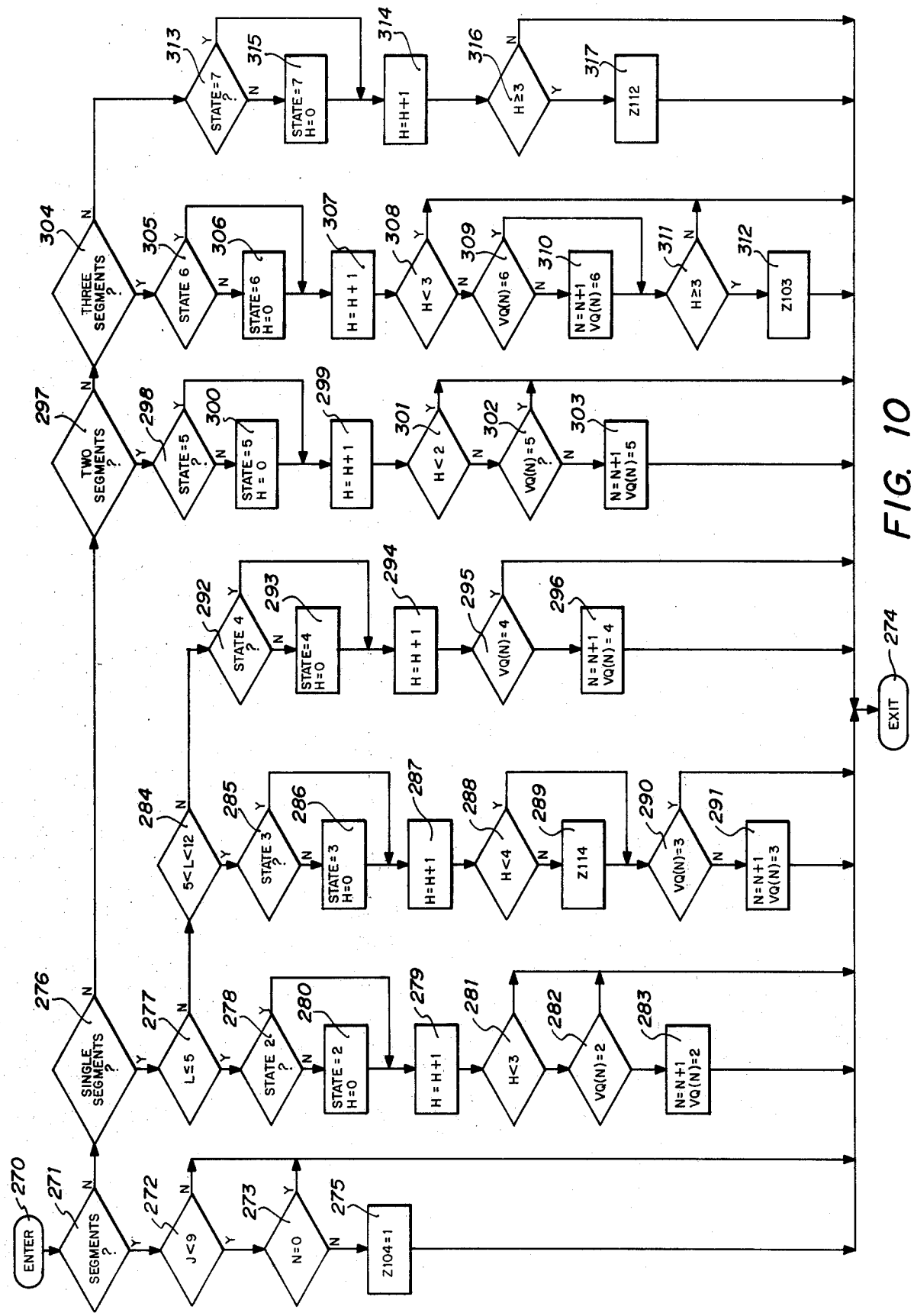
FIG. 10 is a detailed logic decision flow diagram of the vertical feature analyzer of FIG. 7.

A more detailed logic flow diagram of the vertical feature analyzer of FIG. 7 is illustrated in FIG. 10.

Upon completion of a horizontal feature analysis, a vertical feature analysis of the character buffer 27 is initiated at step 187 of FIG. 7. The primary vertical features detected by row-column analyzer 35 are classified into one of six categories: (1) short segment; (2) medium length segment; (3) long segment; (4) two segments; (5) three segments; and (6) more than three segments. A short segment is defined to be less than or equal to five sensor cells in length. A medium length segment is greater than five sensor cells but less than twelve sensor cells in length. A long segment is greater than or equal to twelve sensor cells in length.

The classification of the primary vertical features again constitute processing states during the logic deci-

TABLE VIII

| ROW/COLUMN NUMBER | PRIMARY FEATURES | | |
|---|---|---|---|
| | NUMBER OF SEGMENTS IN ROW | IN COLUMN | ROW SEGMENT LENGTH | RIGHTMOST COLUMN OF ROW SEGMENT |
| 0 | 0 | 0 | | |
| 1 | 1 | 1 | 8 | 10 |
| 2 | 1 | 1 | 8 | 10 |
| 3 | 1 | 2 | 8 | 10 |
| 4 | 1 | 2 | 3 | 5 |
| 5 | 1 | 2 | 3 | 5 |
| 6 | 1 | 3 | 3 | 5 |
| 7 | 1 | 3 | 8 | 10 |
| 8 | 1 | 2 | 8 | 10 |
| 9 | 1 | 2 | 8 | 10 |
| 10 | 1 | 2 | 3 | 10 |
| 11 | 1 | 0 | 3 | 10 |
| 12 | 1 | | 3 | 10 |
| 13 | 1 | | 3 | 10 |
| 14 | 1 | | 10 | 10 |
| 15 | 1 | | 10 | 10 |
| 16 | 1 | | 10 | 10 |
| 17 | 0 | | | |
| 18 | 0 | | | |
| 19 | 0 | | | |

TABLE IX

| ROW NUMBER | SECONDARY HORIZONTAL FEATURES | | | | |
|---|---|---|---|---|---|
| | HORIZONTAL STATE HQ( ) | STATE COUNT (H) | FEATURE VALUE | SEGMENT COUNT (M) | FEATURE STATEMENT |
| 0 | | | | | |
| 1 | 3 | 1 | 3 | 1 | HQ(1) = 3 |
| 2 | 3 | 2 | | | |
| 3 | 3 | 3 | | | |
| 4 | 1 | 1 | | | |
| 5 | 1 | 2 | 1 | 2 | HQ(2) = 1 |
| 6 | 1 | 3 | | | |
| 7 | 3 | 1 | 3 | 3 | HQ(3) = 3 |
| 8 | 3 | 2 | | | |
| 9 | 3 | 3 | | | |
| 10 | 2 | 1 | | | |
| 11 | 2 | 2 | 2 | 4 | HQ = 2 |
| 12 | 2 | 3 | | | |
| 13 | 2 | 4 | | | |
| 14 | 4 | 1 | 4 | 5 | HQ(5) = 4 |
| 15 | 4 | 2 | | | |
| 16 | 4 | 3 | | | |
| 17 | | | | | |
| 18 | | | | | |
| 19 | | | | | |

As may be seen by inspection of Table IX, the secondary features derived are a medium length segment at the top of the character 3, followed by a short segment to the left side of the character 1, followed by a medium length segment 3, followed by a short segment to the right side of the character 2, followed by a long segment along the bottom of the character 4.

sion processing of a column.

TABLE X

| SYMBOL | SECONDARY VERTICAL FEATURES |
|---|---|
| VQ(1) | First Detected Vertical Segment |
| VQ(2) | Second Detected Vertical Segment |
| VQ(3) | Third Detected Vertical Segment |
| VQ(4) | Fourth Detected Vertical Segment |
| VQ(5) | Fifth Detected Vertical Segment |
| VQ(6) | Sixth Detected Vertical Segment |

TABLE X-continued

| SYMBOL | SECONDARY VERTICAL FEATURES |
|---|---|
| VQ(N) | Last Detected Vertical Segment |
| Z103 | Three or more consecutive columns with three segments |
| Z104 | No segment found in a column associated with the image |
| Z112 | Three or more consecutive columns with more than three segments |
| Z114 | Four or more consecutive columns containing medium length segments |

As shwon in Table X, there are two categories of secondary vertical features, VQ features and Z features. The VQ features represent character segments detected in the column of an image, and the Z features provide an additional measure of the interrelationship between the detected segments. The VQ features are indexed from one to six to represent the sequence in which the vertical segments are detected. Typically, one to three VQ features are derived from an image. In addition, a VQ feature will be assigned a state value from two to six corresponding to the state in which it is derived. More particularly, a state value of two is assigned when three consecutive columns containing a short segment occurs. A state value of three is assigned when a medium length segment occurs in a column, and a state value of four is assigned when a long segment occurs in a column. When two or more consecutive columns have two character segments therein, a state value of five is assigned. When three or more consecutive columns have three character segments therein, a state value of six is assigned.

Entry is made at a logic step 270, from which a transfer is made to a logic step 271 to detect the presence of a vertical character segment. If no vertical segments are detected, a transfer is made from step 271 to a logic step 272 to determine whether the column number (J) of the current column of character buffer 27 is less than nine. If the current column number is equal to or greater than nine, a transfer is made from step 272 to step 274 to discontinue the vertical feature analysis. A transfer then is made from step 274 to step 188 of FIG. 7. If the current column number is less than nine, however, a transfer is made from step 272 to a logic step 273 where the current count (N) of a vertical segment counter internal to RAM 147 is compared to the number 0. If the current count is equal to zero, a transfer is made from step 273 to step 274. If the current count is not zero, however, a transfer is made from step 273 to a logic step 275 where a secondary feature Z104 is indicated in RAM 174. From Step 275, a transfer is made to step 274.

If any character segments are detected at step 271, a transfer is made from step 271 to a logic step 276 to determine if more than a single segment is present. If a single segment is present, a transfer is made from step 276 to a logic step 277. If the segment length is less than or equal to five cells, a transfer is made from step 277 to a logic step 278 to examine the state register. If a state 2 is detected, a transfer is made from step 278 to a logic step 279 where the state counter is incremented by one. If the state indicated by the state register is not a state 2, however, a transfer is made from step 278 to a logic step 280 where the state register is set to indicate a state 2 and the state counter is reset. A transfer then is made from step 280 to step 279.

From step 279, a transfer is made to a logic step 281 where the current count of the state counter is compared to the number 3. If the current count is less than three, a transfer is made from step 281 to step 274. If the current count is greater than or equal to three, however, a transfer is made from step 281 to a logic step 282 where the state value of the last detected vertical segment is compared to the number 2. If the state value of equal to two, a transfer is made from step 282 to step 274. If the state value is other than two, however, a transfer is made from step 282 to a logic step 283 where the vertical segment counter is incremented by one and a state value of two is assigned to the last detected vertical segment. A transfer then is made from step 283 to step 274.

If the length of the character segment is greater than five sensor cells as determined at step 277, a transfer is made from step 277 to a logic step 284. At step 284, the length of the vertical segment is tested to determine whether it is between five and twelve sensor cells in length. If the segment length is between five and twelve sensor cells, a transfer is made from step 284 to a logic step 285 where the state register is examined for a state 3 indication. If a state 3 is not detected, a transfer is made from step 285 to a logic step 286 where the state register is set to indicate a state 3 and the state counter is reset. If a state 3 is detected, however, a transfer is made from step 285 to a logic step 287 where the state counter is incremented by one.

From step 287 a transfer is made to a logic step 288 where the current count of the state counter is compared to the number 4. If the current count is greater than or equal to four, a transfer is made from step 288 to a logic step 289 where the occurrence of secondary feature Z114 is indicated in RAM 147. From step 289 a transfer is made to a logic step 290. If the current count of the state counter is less than four, however, a transfer is made from step 288 to step 290.

At step 290, the state value of the last detected vertical segment is compared to the number 3. If the state value of the last detected vertical segment is equal to three, a transfer is made from step 290 to step 274. If the state value is not equal to three, a transfer is made from step 290 to a logic step 291 where the vertical segment counter is incremented by one and a state value of three is assigned to the last detected vertical segment. A transfer then is made from step 291 to step 274.

If the character segment length is not between five and twelve cells at step 284, a transfer is made from step 284 to a logic step 292 where the state register is examined for a state 4 indication. If a state 4 is not detected, a transfer is made from step 292 to a logic step 293 where the state register is set to indicate a state 4 and the state counter is reset. A transfer then is made from step 293 to a logic step 294. If the state register indicates a state 4 at step 292, however, a transfer is made from step 292 to step 294 where the state counter is incremented by one.

From step 294, a transfer is made to a logic step 295 where the state value of the last detected vertical segment is compared to the number 4. If the state value is equal to four, a transfer is made from step 295 to step 274. If the state value is not equal to four, however, a transfer is made from step 295 to a logic step 296 where the vertical segment counter is incremented by one and a state value of four is assigned to the last detected vertical segment. A transfer then is made from step 296 to step 274.

Referring again to step 276, if the number of vertical segments is not equal to one, a transfer is made from step 276 to a logic step 297 to test for the presence of two vertical segments. If two vertical segments are present, a transfer is made from step 297 to a logic step 298 where the state register is examined for a state 5 indication. If a state 5 is indicated, a transfer is made from step 298 to a logic step 299. If the detected state is not a state 5, a transfer is made from step 298 to a logic step 300 where the state register is set to indicate a state 5 and the state counter is reset. A transfer then is made from step 300 to step 299 where the state counter is incremented by one.

From step 299 a transfer is made to a logic step 301 where the current count of the state counter is compared to the number 2. If the current count is less than two, a transfer is made from step 301 to step 274. If the current count is not less than two, a transfer is made from step 301 to a logic step 302 where the state value of the last detected vertical segment is compared to the number 5. If the state value is equal to five, a transfer is made from step 302 to step 274. If the state value is not equal to five, however, a transfer is made from step 302 to a logic step 303 where the vertical segment counter is incremented by one and the last detected vertical segment is assigned a state value of five. A transfer then is made from step 303 to step 274.

If the number of vertical character segments is other than two, a transfer is made from step 297 to a logic step 304 to determine whether the number of character segments is equal to three. If the number of character seg- If the current count of the state counter is less than three, a transfer is made from step 311 to step 274. If the current count is greater than or equal to three, however, a transfer is made from step 311 to a logic step 312 where the occurrence of secondary feature Z103 is indicated in RAM 147. A transfer then is made from step 312 to step 274.

If the number of vertical character segments is not equal to three at step 304, a transfer is made from step 304 to a logic step 313. At step 313, the state register is examined for a state 7 indication. If a state 7 is indicated, a transfer is made from step 313 to a logic step 314. If a state 7 is not indicated, however, a transfer is made from step 313 to a logic step 315 where the state register is set to indicate a state 7 and the state counter is reset. A transfer then is made from step 315 to step 314.

From step 314 a transfer is made to a logic step 316 where the current count of the state counter is compared to the number three. If the current count is greater than or equal to three, a transfer is made from step 316 to a logic step 317 where the occurrence of secondary feature Z112 is indicated in RAM 147. A transfer then is made from step 317 to step 274. Further, if the current count of the state counter is less than three at step 316, a transfer is made from step 316 to step 274.

The secondary features which are derived during the vertical feature analysis are tabulated in Table XI for the character image of FIG. 9.

TABLE XI

| | SECONDARY VERTICAL FEATURES | | | | |
|---|---|---|---|---|---|
| COLUMN NO. | VERTICAL STATE VQ( ) | STATE COUNT H | FEATURE VALUE | SEGMENT COUNT (N) | FEATURE STATEMENT |
| 0 | 2 | 1 | | | |
| 1 | 2 | 2 | | | |
| 2 | 5 | 1 | | | |
| 3 | 5 | 2 | 5 | 1 | VQ(1) = 5 |
| 4 | 5 | 3 | | | |
| 5 | 6 | 1 | | | |
| 6 | 6 | 2 | | | |
| 7 | 5 | 1 | | | |
| 8 | 5 | 2 | | | |
| 9 | 5 | 3 | | | |
| 10 | | | | | |
| 11 | | | | | | ments is equal to three, a transfer is made from step 304 to a logic step 305 where the state register is examined for a state 6 indication. If a state other than state 6 is indicated, a transfer is made from step 305 to a logic step 306 where the state register is set to indicate a state 6 and the state counter is reset. A transfer then is made from step 306 to a logic step 307. If the state register indicates a state 6 at step 305, a transfer is made from step 305 to step 307.

From step 307 a transfer is made to a logic step 308 where the current count of the state counter is compared to the number 3. If the current count is less than three, a transfer is made from step 308 to step 274. If the current count is not less than three, however, a transfer is made from step 308 to a logic step 309 where the state value of the last detected vertical segment is compared to the number 6. If the state value is not equal to six, a transfer is made from step 309 to a logic step 310 where the vertical segment counter is incremented by one and the last detected vertical segment is assigned a state value of six. A transfer then is made from step 310 to a logic step 311. If the state value at step 309 is equal to six, however, a transfer is made from step 309 to step 311 where the current count of the state counter is compared to the number 3.

Figure 11A:
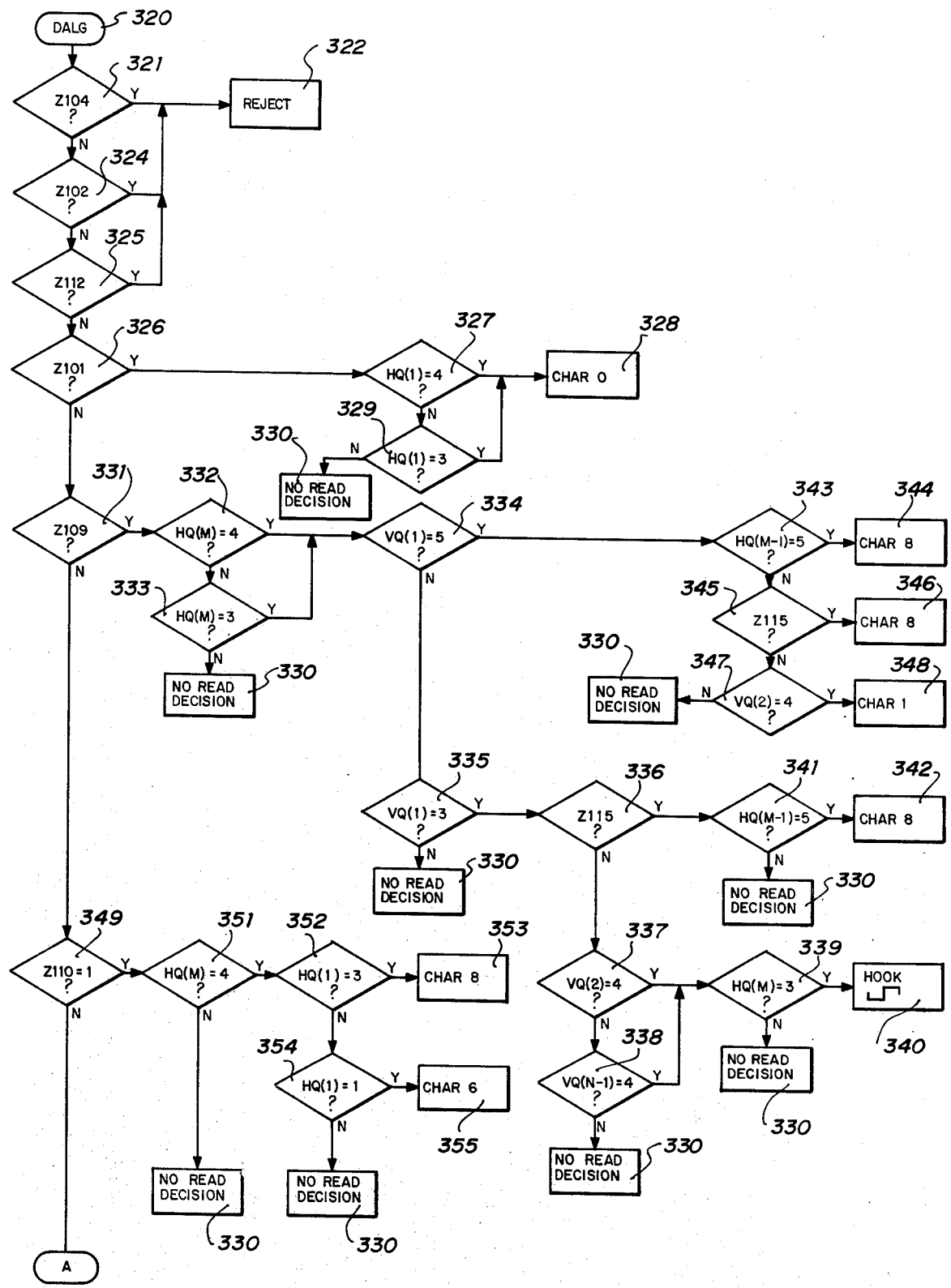
FIGS. 11A-11C are detailed logic decision flow diagrams of the character decision logic of FIG. 7.
Figure 11B:
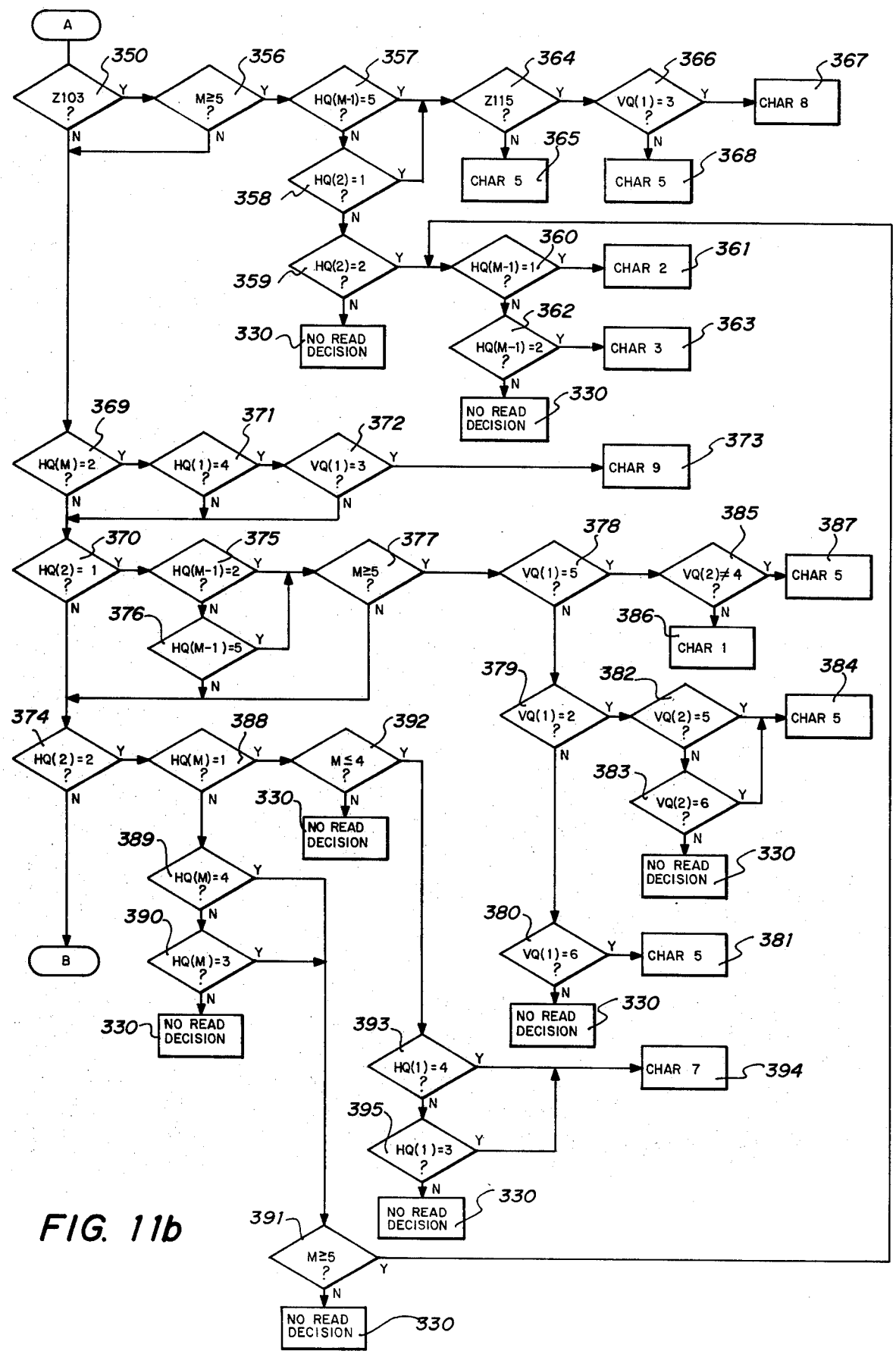
Figure 11C:
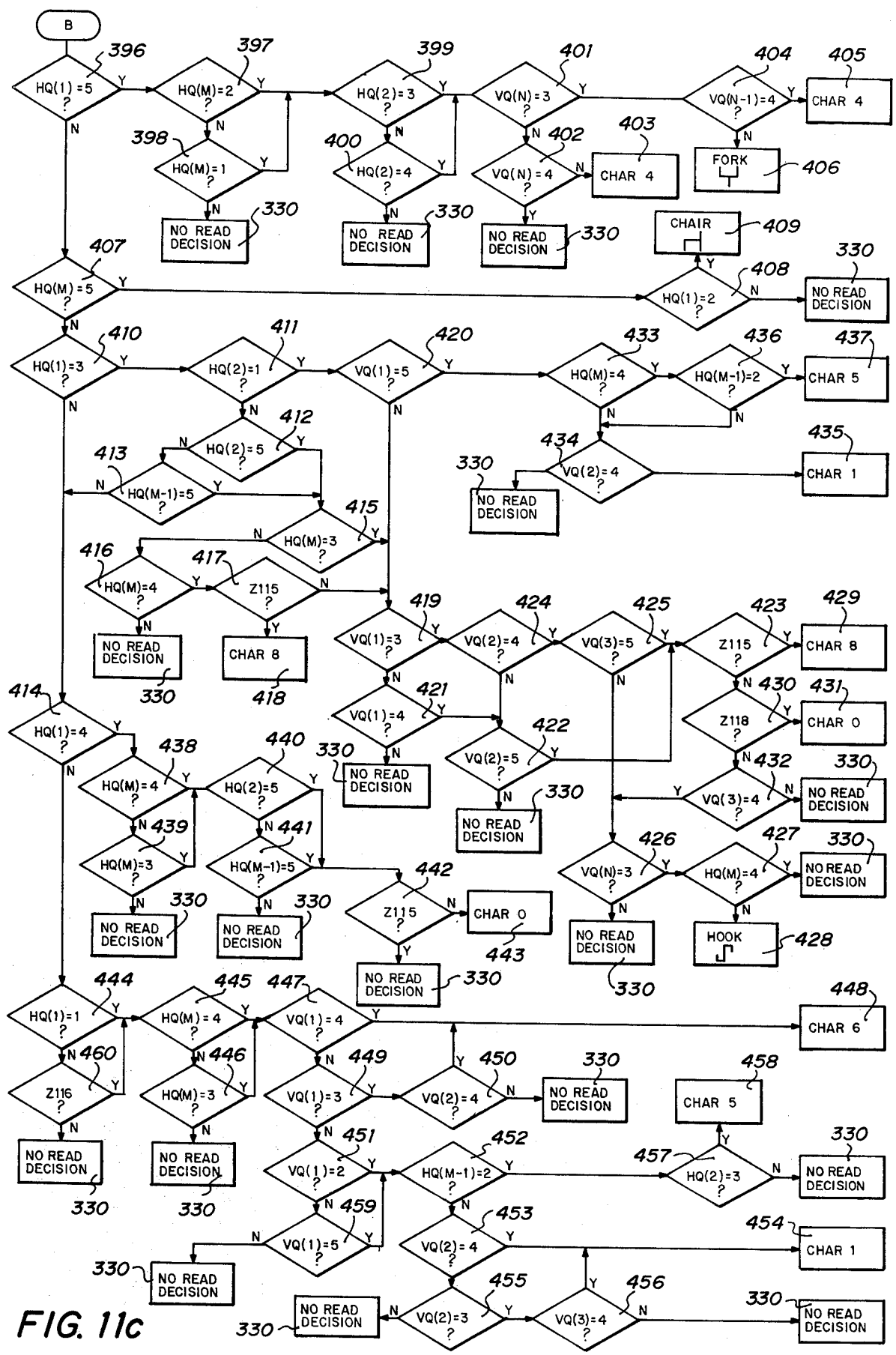

FIGURES 11a–11c

FIGS. 11a, 11b and 11c illustrate in a more detailed logic flow diagram form the character decision process step 191 of FIG. 7.

Entry is made at logic step 320, and a transfer is made from step 320 to a logic step 321 where RAM 147 is scanned for secondary feature Z104. If the secondary feature is detected, a transfer is made from step 321 to a logic step 322, where a reject decision is indicated and a transfer is made to step 192 of FIG. 7. If the secondary feature is not detected, a transfer is made from step 321 to a logic step 324 where RAM 147 is scanned for secondary feature Z102.

If the secondary feature Z102 is detected, a transfer is made from step 324 to step 322. Otherwise, a transfer is made from step 324 to a logic step 325 where RAM 147 is scanned for secondary feature Z112. If feature Z112 is detected, a transfer is made from step 325 to step 322. If the feature is not detected, however, a transfer is made from step 325 to a logic step 326 where RAM 147 is scanned for secondary feature Z101.

If feature Z101 is detected, a transfer is made from step 326 to a logic step 327 where the state value of the first detected horizontal segment is compared to the number 4. If the state value is equal to four, a transfer is made from step 327 to a logic step 328, where a character 0 decision is indicated and a transfer is made to step 192 of FIG. 7. If the state value is not equal to four, a transfer is made from step 327 to a logic step 329 to compare the state value with the number 3. If the state value is equal to three, a transfer is made from step 329 to step 328 where a character 0 decision is indicated and a transfer is made to step 192 of FIG. 7. If the value is not equal to three, however, a transfer is made from step 329 to a logic step 330 where a no read decision is indicated and a transfer is made to step 192 of FIG. 7.

If secondary feature Z101 is not detected at step 326, a transfer is made from step 326 to a logic step 331 where RAM 147 is scanned for secondary feature Z109. If the feature Z109 is detected, a transfer is made from step 331 to a logic step 332 where the state value of the last detected horizontal segment is compared with the number 4. If the state value is not equal to four, a transfer is made from step 332 to a logic step 333 where the state value is compared with the number 3. If the state value is not equal to three, a transfer is made from step 333 to a logic step 330 where a no read decision is made. If the state value is equal to three, however a transfer is made from step 333 to a logic step 334 where the state value of the first detected vertical segment is compared to the number 5. Further, if the state value is equal to four at step 332, a transfer is made from step 332 to step 334.

If the state value of the first detected vertical segment is not equal to five at step 334, a transfer is made from step 334 to a logic step 335. At step 335, if the state value is not equal to three, a transfer is made from step 335 to step 330. If the state value is equal to three at step 335, however a transfer is made from step 335 to a logic step 336 where RAM 147 is scanned for secondary feature Z115.

If the secondary feature Z115 is not detected, a transfer is made from step 336 to a logic step 337 to compare the state value of the second detected vertical statement with the number 4. If the state value is not equal to four, a transfer is made from step 337 to a logic step 338 where the state value of the next to the last detected vertical segment is compared to the number 4. If the state value at step 338 is not equal to four, a transfer is made from step 338 to step 330. If the state value is equal to four at step 338, however, a transfer is made from step 338 to a logic step 339 where the state value of the last detected horizontal segment is compared to the number 3. Further if the state value of the second detected vertical segment at step 337 is four, a transfer is made from step 337 to step 339.

At step 339, if the state value of the last detected horizontal segment is equal to three, a transfer is made from step 339 to a logic step 340 where a hook symbol is identified and a transfer is made to step 192. If the value is not three, however, a transfer is made from step 339 to step 330.

If the secondary feature Z115 is detected at step 336, a transfer is made from step 336 to a logic step 341 where the state value of the next to last detected horizontal segment is compared to the number 5. If the state value is equal to five, a transfer is made from step 341 to a logic step 342 where character 8 decision is indicated and a transfer is made to step 192. If the state value is not five, however, a transfer is made from step 341 to step 330.

At step 334, a transfer is made from step 334 to a logic step 343 if the state value of the first detected vertical segment is equal to one. At step 343 the state value of the next to the last detected horizontal segment is compared to the number 5. If the state value is five, a transfer is made from step 343 to a logic step 344 where a character 8 decision is indicated and a transfer is made to step 192. If a state value other than five is detected, however, a transfer is made from step 343 to a logic step 345 where RAM 147 is scanned for secondary feature Z115. If the feature Z115 is detected, a transfer is made from step 345 to a logic step 346 where a character 8 decision is indicated and a transfer is made to step 192. If the feature Z115 is not detected, a transfer is made from step 345 to a logic step 347 where state value of the second detected vertical segment is compared to the number 4. If the state value is equal to four, a transfer is made from step 347 to a logic step 348 where character 1 decision is indicated and a transfer is made to step 192. If the state value is not four, a transfer is made from step 347 to step 330 where a no read decision is indicated and a transfer is made to step 192.

Referring again to step 331, a transfer is made from step 331 to a logic step 349 if the secondary feature Z109 is not detected. At step 349, RAM 147 is scanned for secondary feature Z110. If the secondary feature Z110 is not detected, a transfer is made from step 349 to a logic step 350. If the secondary feature is detected, however, a transfer is made from step 349 to a logic step 351 where the value of the last detected horizontal segment is compared to the number 4. If the value is a four, a transfer is made from step 351 to a logic step 352. If the value is not a four, a transfer is made from step 351 to step 330.

At step 352, the value of the first detected horizontal segment is compared to the number 3. If the value is three, a transfer is made from step 352 to a logic step 353 where a character 8 decision is indicated and a transfer is made to step 192 OF FIG. 7. If a value other than three is detected, however, a transfer is made from step 352 to a logic step 354 where the value of the first detected horizontal segment is compared to the number 1. If the value is equal to three a transfer is made from step 354 to a logic step 355 where a character 6 decision is indicated and a transfer is made to step 192. Otherwise, a transfer is made from step 354 to step 330.

At step 350, RAM 147 is scanned for secondary feature Z103. If the feature is detected, a transfer is made from step 350 to a logic step 356 where the current count of the horizontal segment counter is compared to the number 5. If the current count is greater than or equal to 5, a transfer is made from step 356 to a logic step 357 where the state value of the next to the last detected horizontal segment is compared to the number 5. If the state value is not equal to five, a transfer is made from step 357 to a logic step 358 where the state value of the second detected horizontal segment is compared to the number 1. If the state value at step 358 is not equal to one, a transfer is made from step 358 to a logic step 359 where the state value of the second detected horizontal segment is compared to the number 2. If the state value at step 359 is not equal to two, a transfer is made from step 359 to step 330. If the state value at step 359 is equal to two, however, a transfer is made from step 359 to a logic step 360 where the state value of the next to last detected horizontal segment is compared to the number 1.

If the state value at step 360 is equal to one, a transfer is made from step 360 to a logic step 361 where a character 2 decision is indicated and a transfer is made to step 192. If the state value at step 360 is not equal to one, however, a transfer is made from step 360 to a logic step 362 where the state value of the next to the last detected horizontal segment is compared to the number 2. If the state value at step 362 is equal to two, a transfer is made from step 362 to a logic step 363 where a character 3 decision is indicated and a transfer is made to step 192. Otherwise, a transfer is made from step 362 to step 330.

If the state value detected at step 358 is a one or the state value detected at step 357 is a five, a transfer is made from step 358 or step 357, respectively, to a logic step 364. At step 364, RAM 147 is scanned for secondary feature Z115. If the feature is not detected, a transfer is made from step 364 to a logic step 365 where a character 5 decision is indicated and a transfer is made to step 192. If the feature is detected, however, a transfer is made from step 364 to a logic step where the state value of the first detected vertical segment is compared to the number 3. If the state value is equal to three, a transfer is made from step 366 to a logic step 367 where character 8 decision is indicated and a transfer is made to step 192. If the state value is not equal to three, a transfer is made from step 366 to a logic step 368 where a character five decision is indicated and a transfer is made to step 192.

Referring again to steps 350 and 356, if the secondary feature Z103 is not detected or the current count of the horizontal segment counter is less than five, a transfer is made from steps 350 or 356, respectively, to a logic step 369. At step 369, the state value of the last detected horizontal segment is compared to the number 2. If the state value does not equal to two, a transfer is made from step 369 to a logic step 370. If the state value is equal to two, however, a transfer is made from step 369 to a logic step 371 where the state value of the first detected horizontal segment is compared to the number 4. If the state value at step 371 is equal to four, a transfer is made from step 371 to a logic step 372. If the state value is not equal to four, however, a transfer is made from step 371 to step 370.

At step 372, the state value of the first detected vertical segment is compared to the number 3. If the state value is not equal to three, a transfer is made from step 372 to step 370. If the state value is equal to three, a transfer is made from step 372 to a logic step 373 where a character nine decision is indicated and a transfer is made to step 192.

At step 370, the state value of the second detected horizontal segment is compared to the number 1. If the state value is not one, a transfer is made from step 370 to a logic step 374. If the state value is equal to one, however, a transfer is made from step 370 to a logic step 375 where the state value of the next to the last detected horizontal segment is compared to the number 2. If the state value at step 375 is not equal to two, a transfer is made from step 375 to a logic step 376 where the state value of the next to the last detected horizontal segment is compared with the number 5. If no match occurs at step 376, a transfer is made from step 376 to step 374. If a match occurs at either step 375 or step 376, however, a transfer is made from step 375 or step 376, respectively, to a logic step 377 where the current count of the horizontal segment counter is compared to the number 5. If the current count is less than five, a transfer is made from step 377 to step 374. If the current count is greater than or equal to five, a transfer is made from step 377 to a logic step 378 where the state value of the first detected vertical segment is compared to the number 5. If no match occurs, a transfer is made from step 378 to a logic step 379 where the state value is compared to the number 2. If the state value is not equal to two, a transfer is made from step 379 to a logic step 380 where the state value is compared to the number 6. If the state value at step 380 is six, a transfer is made from step 380 to a logic step 381 where a character five decision is indicated and a transfer is made to step 192. If the state value is not six, a transfer is made from step 380 to step 330.

If the state value at step 379 is equal to two, a transfer is made from step 379 to a logic step 382 where the state value of the second detected vertical segment is compared to the number 5. If the state value at step 382 is not five, a transfer is made from step 382 to a logic step 383 where the state value is compared to the number 6. If the state value at step 383 is not a six, a transfer is made from step 383 to step 330. If the value is six, however, a transfer is made from step 383 to a logic step 384 where character 5 decision is indicated and a transfer is made to step 192. Further, if the state value is five at step 382, a transfer is made from step 382 to step 384.

If the state value is five at step 378, a transfer is made from step 378 to a logic step 385 where the state value of the second detected vertical segment is compared to the number 4. If the state value is four, a transfer is made from step 385 to a logic step 386 where a character 1 decision is indicated and a transfer is made to step 192. If the state value is not four, however, a transfer is made from step 385 to a logic step 387 where a character 5 decision is indicated and a transfer is made to step 192 of FIG. 7.

At step 374, the state value of the second detected horizontal segment is compared to the number 2. If the state value is equal to two, a transfer is made from step 374 to a logic step 388 where the state value of the last detected horizontal segment is compared to the number 1. If no match occurs, a transfer is made from step 388 to a logic step 389 where the state value is compared to the number four. If the state value is not equal to four, a transfer is made from step 389 to a logic step 390 where the state value is compared to the number 3. If the state value is not a three, a transfer is made from step 390 to step 330. If the state value at step 390 is a three, however, a transfer is made from step 390 to a logic step 391 where the current count of the horizontal segment counter is compared to the number 5. If the current count is less than five, a transfer is made from step 391 to step 330. If the current count is greater than or equal to five, however, a transfer is made from step 391 to a logic step 360 where the logic decision process continues as before described.

If the state value of the last detected horizontal segment is equal to four at step 389, a transfer is made from step 389 to step 391. If the state value is equal to one at step 388, a transfer is made from step 388 to a logic step 392 where the current count of the horizontal segment counter is compared to the number 4. If the current count is greater than four, a transfer is made from step 392 to step 330. If the current count is less than or equal to four, a transfer is made from step 392 to a logic step 393 where the state value of the first detected horizontal segment is examined. If the state value is equal to four, a transfer is made from step 393 to a logic step 394 where a character 7 decision is indicated and a transfer is made to step 192. If the state value at step 393 is not equal to four, however, a transfer is made from step 393 to a logic step 395 where the state value of the first detected horizontal segment is compared to the number 3. If the state value at step 395 is not three, a transfer is made from step 395 to step 330. If the state value is three, however, a transfer is made from step 395 to step 394.

Referring again to step 374, if the value of the second detected horizontal segment is not two, a transfer is made from step 374 to a logic step 396 where the state value of the first detected horizontal segment is examined. If the state value is equal to five, a transfer is made from step 396 to a logic step 397 where the state value of the last detected horizontal segment is compared to the number 2. If the state value is not equal to two, a transfer is made from step 397 to a logic step 398 to compare the state value with the number 1. If the state value is not one, a transfer is made from step 398 to step 330 where a no read decision is indicated and a transfer is made to step 192 of FIG. 7. If the state value is equal to two at step 397 or to one at step 398, a transfer is made from step 397 or 398, respectively, to a logic step 399 where the state value of the second detected horizontal segment is examined. If the state value is not equal to three, a transfer is made from step 399 to a logic step 400 where the state value is compared to the number four. If the state value is not equal to four, a transfer is made from step 400 to step 330. If a match occurs at step 399 or at step 400, however, a transfer is made from step 399 or step 400, respectively, to a logic step 401 where the state value of the last detected vertical segment is examined. If the state value is not equal to three, a transfer is made from step 401 to a logic step 402 where the state value is compared to the number 4. If no match occurs at step 402, a transfer is made from step 402 to a logic step 403 where a character 4 decision is indicated and a transfer is made to step 192 of FIG. 7.

If the state value at step 401 is equal to three, a transfer is made from step 401 to a logic step 404 where the state value of the next to the last detected vertical segment is compared to the number 4. If the state value is equal to four, a transfer is made from step 404 to a logic step 405 where a character 4 decision is indicated and a transfer is made to step 192. If the state value is not equal to four, a transfer is made from step 404 to a logic step 406 where a fork symbol is identified and a transfer is made to step 192.

If the state value of the first detected horizontal segment is not five at step 396, a transfer is made from step 396 to a logic step 407 where the state value of the last detected horizontal segment is compared to the number 5. If the state value is equal to five, a transfer is made from step 407 to a logic step 408 where the state value of the first detected horizontal segment is compared to the number 2. If the state value at step 408 is not equal to two, a transfer is made from step 408 to step 330. If the state value is equal to two, however, a transfer is made from step 408 to a logic step 409 where a chair symbol is identified and a transfer is made to step 192.

If the state value at step 407 is not equal to five, a transfer is made from step 407 to a logic step 410 where the state value of the first detected horizontal segment is compared to the number 3. If the state value is equal to three, a transfer is made from step 410 to a logic step 411 where the state value of the second detected horizontal segment is compared to the number 1. If the state value at step 411 is not equal to one, a transfer is made from step 411 to a logic step 412 where the state value is compared to the number 5. If the state value is not equal to five, a transfer is made from step 412 to a logic step 413 where the state value of the next to the last detected horizontal segment is compared to the number 5. If the state value at step 413 is not equal to five, a transfer is made from step 413 to a logic step 414. If the state value is equal to five, however, a transfer is made from step 413 to a logic step 415. Further, if the state value of the second detected horizontal segment at step 412 is equal to five, a transfer is made from step 412 to step 415.

At step 415, the state value of the last detected horizontal segment is compared to the number 3. If the state value is not equal to three, a transfer is made from step 415 to a logic step 416 where the state value of the last detected horizontal state is compared to the number 4. If the state value at step 416 is not equal to four, a transfer is made from step 416 to step 330. If the state value at step 416 is equal to four, however, a transfer is made from step 416 to a logic step 417 where the RAM 147 is scanned for secondary feature Z115. If the secondary feature is detected, a transfer is made from step 417 to a logic step 418 where a character 8 decision is indicated and a transfer is made to step 192. If the secondary feature Z115 is not detected, a transfer is made from step 417 to a logic step 419. Further, if the value at step 415 is equal to three, a transfer is made from step 415 to step 419.

At step 411, if the value of he second detected horizontal segment is equal to one, a transfer is made from step 411 to a logic step 420 where the state value of the first detected vertical segment is compared to the number 5. If the state value is not equal to five, a transfer is made from step 420 to step 419 where the state value is compared to the number 3. If the state value is not equal to three, a transfer is made from step 419 to a logic step 421 where the state value is compared with the number 4. If the state value is not equal to four, a transfer is made to step 330. If the state value at step 421 is equal to four, however, a transfer is made from step 421 to a logic step 422 where the state value of the second detected vertical segment is compared to the number 5. If the state value is not equal to five, a transfer is made from step 422 to step 330. If the state value at step 422 is equal to 5, however, a transfer is made from step 422 to a logic step 423.

At step 419, if the state value of the first detected vertical segment is equal to three, a transfer is made from step 419 to a logic step 424 where the state value of the second detected vertical segment is examined. If the state value at step 425 is not equal to four, a transfer is made from step 424 to step 422. If the state value is equal to four, however, a transfer is made from step 424 to a logic step 425 where the state value of the third detected vertical segment is examined.

If the state value of the third detected vertical segment is not equal to five at step 425, a transfer is made from step 425 to a logic step 426 where the state value of the last detected vertical segment is compared to the number 3. If the state value at step 426 is not equal to three, a transfer is made from step 426 to step 330. If the state value is equal to three, however, a transfer is made from step 426 to a logic step 427 where the state value of the last detected horizontal segment is examined. If the state value at step 427 is not equal to four, a transfer is made from step 427 to a logic step 428 where a hook symbol is identified and a transfer is made to step 192. If the state value is equal to four, a transfer is made from step 427 to step 330.

If the value of the third detected vertical segment is equal to five step 425, a transfer is made from step 425 to step 423 where the RAM 147 is scanned for secondary feature Z115. If the secndary feature is detected, a transfer is made from step 423 to a logic step 429 where a character 8 decision is indicated and a transfer is made to step 192. If the secondary feature is not detected, however, a transfer is made from step 423 to a logic step 430 where the RAM 147 is scanned for secondary feature Z118. If the secondary feature Z118 is detected, a transfer is made from step 430 to a logic step 431 where a character 0 decision is indicated and a transfer is made to step 192. If the secondary feature Z118 is not detected, a transfer is made from step 430 to a logic step 432 where the state value of the third detected vertical segment is examined. If the state value is equal to four, a transfer is made from step 432 to step 426. If the state value is not equal to four, a transfer is made from step 432 to step 330.

At step 420, if the state value of the first detected vertical segment is equal to five, a transfer is made from step 420 to a logic step 433 where the state value of the last detected horizontal segment is examined. If the state value is not equal to four, transfer is made from step 433 to a logic step 434 where the state value of the second detected vertical segment is compared to the number 4. If the state value at step 434 is not equal to four, a transfer is made from step 434 to step 330. If the state value is equal to four, however, a transfer is made from step 434 to a logic step 435 where character 1 decision is indicated and a transfer is made to step 192. If the state value at step 433 is equal to four, a transfer is made from step 433 to a logic step 436 where the state value of the next to the last detected horizontal segment is compared to the number 2. If the state value is not equal to two, a transfer is made from step 436 to step 434. If the state value is equal to two, a transfer is made from step 436 to a logic step 437 where a character 5 decision is indicated and a transfer is made to step 192.

At step 410, if the state value of the first detected horizontal segment is not equal to three, a transfer is made from step 410 to step 414 where the state value of the first detected horizontal segment is compared to the number 4. If the state value is equal to four, a transfer is made from step 414 to a logic step 438 where the state value of the last detected horizontal segment is examined. If the state value is not equal to four, a transfer is made from step 438 to a logic step 439 where the state value is compared to the number 3. If the state value at step 439 is not equal to three, a transfer is made from step 439 to step 330. If the state value is equal to three, however, a transfer is made from step 439 to a logic step 440. Further, if the state value is equal to four at step 438, a transfer is made from step 438 to step 440.

At step 440, the state value of the second detected horizontal segment is compared to the number 5. If the state value is not equal to five, a transfer is made from step 440 to a logic step 441 where the state value of the next to the last detected horizontal segment is compared to the number 5. If the state value at step 441 is not equal to five, a transfer is made from step 441 to step 330. If the state value is equal to five, however, a transfer is made from step 441 to a logic step 442. Further, if the state value at step 440 is equal to five, a transfer is made from step 440 to step 442.

At step 442, the RAM 147 of FIG. 5 is scanned for secondary feature Z115. If the secondary feature is detected, a transfer is made from step 442 to step 330. If the secondary feature is not detected, however, a transfer is made from step 442 to a logic step 443 where a character 0 decision is indicated and a transfer is made to step 192.

If the state value of the first detected horizontal segment is not equal to four, at step 414 a transfer is made from step 414 to a logic step 444. If the state value is equal to one, a transfer is made from step 444 to a logic step 445 where the state value of the last detected horizontal segment is examined. If the state value at step 445 is not equal to four, a transfer is made from step 445 to a logic step 446 where the state value is compared with the number 3. If the state value at step 446 is not equal to three, a transfer is made from step 446 to step 330. If the value is equal to three, however, a transfer is made from step 446 to a logic step 447 where the state value of the first detected vertical segment is compared to the number 4. Further, at step 445, if the state value is equal to four, a transfer is made from step 445 to step 447. If the state value at step 447 is equal to four, a transfer is made from step 447 to a logic step 448 where a character 6 decision is indicated and a transfer is made to step 192. If the state value is not equal to four, a transfer is made from step 447 to a logic step 449 to compare the state value with the number 3. If the state value at step 449 is equal to three, a transfer is made from step 449 to a logic step 450 where the state value of the second detected vertical segment is examined. If the state value at step 450 is equal to four, a transfer is made from step 450 to step 448. If the state value is not equal to four, a transfer is made from step 450 to step 330.

If the state value at step 449 is not equal to three, a transfer is made from step 449 to logic step 451 where the state value of the first detected vertical segment is compared to the number 2. If the state value at step 451 is equal to two, a transfer is made from step 451 to a logic step 452 where the state value of the next to the last detected horizontal segment is compared with the number 2. If the state value at step 452 is not equal to two, a transfer is made from step 452 to a logic step 453 where the state value of the second detected vertical segment is compared with the number 4. If the state value at step 453 is equal to four, a transfer is made from step 453 to a logic step 454 where a character one decision is indicated and a transfer is made to step 192. If the state value is not equal to four, a transfer is made from step 453 to a logic step 455 where the state value of the second detected vertical segment is compared with the number 3. If the state value at step 455 is not equal to three, a transfer is made from step 455 to step 330. If the state value is equal to three, however, a transfer is made from step 455 to a logic step 456 where the state value of the third detected vertical segment is examined. If the state value at step 456 is not equal to four, a transfer is made from step 456 to step 330. If the state value is equal to four, however, a transfer from step 456 to step 454 is made.

At step 452, if the state value of the next to the last detected horizontal segment is equal to two, a transfer is made from step 452 to a logic step 457 where the state value of the second detected horizontal segment is examined. If the state value at step 457 is equal to three, a transfer is made from step 457 to a logic step 458 where a character 5 decision is indicated and a transfer is made to step 192. If the state value is not equal to three, a transfer is made from step 457 to step 330.

If the state value of the first detected vertical segment at step 451 is not equal to two, a transfer is made from step 451 to a logic step 459 where the state value is compared with the number 5. If the state value is equal to five, a transfer is made from step 459 to step 452. If the state value is not equal to five, a transfer is made from step 459 to step 330.

At step 444, if the state value of the first detected horizontal segment is not equal to one, a transfer is made from step 444 to a logic step 460 where RAM 147 is scanned for secondary feature Z116. If the secondary feature is detected, a transfer is made from step 460 to step 445. If the secondary feature is not detected, a transfer is made from step 460 to step 330.

In accordance with the invention, there is provided a reliable character recognition system for reading special characters and numerics printed in plural fonts of unknown order. The system is substantially insensitive to variations in character stroke size, and requires no amplitude correlation, image normalization or precise centering of a character image in an image mosaic. Both horizontal and vertical analysis of a character image are employed to detect a minimal feature set from which secondary features representative of the character image are derived. The secondary features then are applied through a sequential logic decision tree to identify a character. Conflicts in the character decision analysis are resolved without the further derivation of features.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A method of detecting printed characters of plural fonts interspersed on a document surface, which comprises:
   a. sensing a character and storing a two-dimensional electronic character image thereof;
   b. scanning each row of said character image to detect horizontal primary features including the number of horizontal character segments, and the segment length and rightmost segment coordinate for rows having a single horizontal character segment;
   c. scanning each column of said character image to detect vertical primary features including the number of vertical character segments, and the segment length for those columns having a single vertical segment;
   d. comparing said horizontal primary features and said vertical primary features of a current row or column with those of previous rows and columns of said character image;
   e. assigning a classification code to each row and column of said character image indication of the type and order of occurrence of said horizontal and said vertical character segments in successive rows and columns of said character image;
   f. forming secondary features which reflect the order of occurrence of said classification codes; and
   g. identifying said character from said secondary features.

2. A character recognition system, which comprises:
   a. data lift means for scanning a printed character and forming a character image;
   b. analyzer means in electrical communication with said data lift means for scanning said character image by rows and columns in a certain predetermined order to detect horizontal and vertical primary features;
   c. horizontal analyzing means receiving said horizontal primary features in said order for assigning a horizontal classification code in said order to each of said rows according to the size, number and position of horizontal character segments detected within each of said rows, and forming secondary horizontal features based upon the relative position of each horizontal classification code within said order;
   d. vertical analyzing means receiving said vertical primary features in said order for assigning vertical classification codes in said order to each of said columns according to the size and number of vertical character segments detected within each column and forming secondary vertical features based upon the relative position of each vertical classification code within said order; and
   e. sequential logic decision means in electrical communication with said horizontal analyzing means and said vertical analyzing means for sequentially testing said secondary horizontal features and said secondary vertical features to identify said printed character.

3. The combination set forth in claim 2, wherein said horizontal analyzing means and said vertical analyzing means include structure for sensing as primary features the number of character segments detected in each row and column of said character image, the segment length and rightmost segment coordinate for each row of said character image having a single character segment, and the segment length for each column of said character image having a single character segment.

4. The combination set forth in claim 3, wherein said horizontal analyzing means includes means for storing six classification codes and means for indicating the occurrence of a short left side segment, a short right side segment, a medium length segment, a long segment, two segments and three or more segments in said rows.

5. The combination set forth in claim 4, wherein said horizontal analyzing means includes means for sensing as said secondary horizontal features the order of detection of said horizontal character segments, the number of said horizontal character segments detected, and the weight to be accorded to said horizontal character segments in identifying said printed character.

6. The combination set forth in claim 3, wherein said vertical analyzing means includes means for storing six classification codes and for indicating the occurrence of a short segment, a medium length segment, a long segment, two segments, three segments and more than three segments in said columns.

7. The combination set forth in claim 6, wherein said vertical analyzing means includes means for sensing as said secondary vertical features the order of detection of said vertical character segments, the number of said vertical character segments detected, and the weight to be accorded to said vertical character segments in identifying said printed character.

8. A system for recognizing a string of characters printed in plural fonts of unknown order, which comprises:

a. video data lift means for scanning said string of characters and forming character images thereof;

b. image scan means in electrical communication with said video data lift means for scanning one character image of said character images horizontally and vertically by rows and columns, respectively, to detect primary features including the number of character segments in each of said rows and columns, the segment length and rightmost segment coordinate for each row of said rows having a single character segment, and the segment length for each column of said columns having a single character segment;

c. feature generation means receiving said primary features for assigning classifications to each row and column of said one character image, and form the order of occurrence of said classifications forming secondary features including the order of detection of said character segments, the number of said character segments detected, and the weight to be accorded said character segments in the identification of one of said string of characters; and d. sequential logic decision means responsive to said secondary features for identifying one of said string of characters.

9. The combination set forth in claim 8, wherein said image scan means includes:

a. logic control means responsive to said feature generation means for controlling the operation of said image scan means;

b. multiplexer means in electrical communication with said video data lift means for ordering the selection of each row element of said one character image to provide both a horizontal and a vertical scan of said one character image;

c. selection control means responsive to said logic control means and said video data lift means for controlling the operation of said multiplexer means;

d. edge detecting means responsive to said logic control means and receiving said one character image from said multiplexer means for detecting leading and trailing edges of said character segments occurring the the rows and columns of said one character image;

e. image counter means responsive to said logic control means for indicating the current row and column of said one character image;

f. segment counter means incremented by said logic control means upon the detection of one of said leading edges by said edge detecting means for indicating the number of segments detected in a row or column of said one character image;

g. segment length counter means responsive to said logic control means for counting the number of row or column elements in said character segments; and h. segment position counter means responsive to said logic control means for indicating the column count of said image counter means when one of said trailing edges is detected by said edge detecting means in a row of said on character image.

10. In a character recognition system where an image forming means scans a printed character and forms a character image thereof and an analyzer scans said character image horizontally and vertically to detect primary features of said character, the combination which comprises:

a. first multiplexer means in electrical communication with said analyzer for singularly selecting said primary features and secondary features formed from said primary features;

b. logic compare means connected to the output of said multiplexer means for comparing said primary features and said secondary features with data fields of stored processing instructions;

c. reset logic means in electrical communication with said image forming means and said analyzer means for providing status indications therefrom;

d. logic control means having inputs connected to the outputs of said logic compare means an said reset logic means for indicating a skip instruction condition;

e. address control means responsive to said logic control means for controlling the addressing of said processing instructions;

f. address register means responsive to said address control means for selecting said processing instructions;

g. ROM means responsive to said address register means for providing said processing instructions to said address register means, said logic control means, said reset logic means, said logic compare means and said first multiplexer means;

h. instruction decoding means in electrical communication with said ROM means for decoding said processing instructions and indicating the identity of said processing instructions to said reset logic means and said address control means;

i. a feature address register responsive to said instruction decoder means and receiving secondary feature addresses for selecting said secondary features;

j. RAM means responsive to said feature address register and said instruction decoding means for providing said secondary features;

k. arithmetic means receiving said secondary features from said RAM means and said processing instructions from said ROM means for modifying said secondary features;

l. an adder having one input connected to the output of said arithmetic means and a second input connected to the output of said ROM means for providing said secondary feature addresses;

m. logic OR means having one input connected to the output of said adder for performing a logical OR operation;

n. feature data register means responsive to said instruction decoding means and receiving the output of said logic OR means for supplying said secondary features to said RAM means;

o. second multiplexer means responsive to said instruction decoding means and having one input connected to the output of said feature data register means and a second input connected to a logic reference for providing a second input to said logic OR means; and p. character identification register means responsive to said instruction decoding means and in electrical communication with said ROM means for indicating a character decision.

* * * * *